US012693418B2

(12) United States Patent
Gupta et al.

(10) Patent No.: US 12,693,418 B2
(45) Date of Patent: Jul. 28, 2026

(54) USE OF LIDAR FOR INTELLIGENT SPACE MANAGEMENT

(71) Applicant: VELODYNE LIDAR USA, INC., San Jose, CA (US)

(72) Inventors: Anurag Gupta, San Jose, CA (US); Vishal Jain, Walnut Creek, CA (US); Neel Shah, San Jose, CA (US); Farnam Adelkhani, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 971 days.

(21) Appl. No.: 17/958,320

(22) Filed: Oct. 1, 2022

(65) Prior Publication Data

US 2024/0111051 A1 Apr. 4, 2024

(51) Int. Cl.
*G01S 17/86* (2020.01)
*G01S 17/89* (2020.01)

(52) U.S. Cl.
CPC .............. *G01S 17/86* (2020.01); *G01S 17/89* (2013.01)

(58) Field of Classification Search
CPC ........ G01S 17/86; G01S 17/89; G01S 7/4802; G06V 20/52
See application file for complete search history.

(56) References Cited

U.S. PATENT DOCUMENTS

| | | | |
|---|---|---|---|
| 10,565,786 B1 * | 2/2020 | Klein ................... | G06F 3/04815 |
| 2004/0031335 A1 * | 2/2004 | Fromme ................. | G01F 22/00 |
| | | | 73/865 |
| 2022/0026573 A1 * | 1/2022 | Baribault .............. | G01S 7/4817 |
| 2022/0044430 A1 * | 2/2022 | Eckman ................ | G01S 7/4817 |
| 2023/0080178 A1 * | 3/2023 | Hajjar ................... | G06T 7/0004 |
| | | | 382/106 |
| 2023/0100249 A1 * | 3/2023 | Urano ..................... | G06T 11/00 |
| | | | 382/103 |
| 2023/0306833 A1 * | 9/2023 | Yoshizawa ............ | G01S 7/4808 |
| 2023/0410545 A1 * | 12/2023 | Slensker ............... | G07F 19/207 |
| 2025/0299441 A1 * | 9/2025 | Keilaf ..................... | G01S 17/89 |

* cited by examiner

*Primary Examiner* — Md Saiful A Siddiqui
(74) *Attorney, Agent, or Firm* — Kilpatrick Townsend & Stockton LLP

(57) ABSTRACT

Methods and systems related to intelligent space management are described. An example method of monitoring an environment includes receiving a first image of an environment captured by a camera, receiving a point cloud of the environment generated by a lidar device, registering at least a portion of the point cloud with at least a portion of the first image, receiving, from a user device, a user selection of a zone in the environment based on a user interaction with a second image presented on the user device, the second image including at least one of a portion of the first image or a portion of the point cloud, and monitoring point cloud data collected by the lidar device for the selected zone.

22 Claims, 19 Drawing Sheets

750

500

510

600

601

750

1400

USE OF LIDAR FOR INTELLIGENT SPACE MANAGEMENT

FIELD OF TECHNOLOGY

The present disclosure relates generally to lidar technology and, more specifically, to the use of lidar for intelligent space management.

BACKGROUND

Lidar (light detection and ranging) systems measure the attributes of their surrounding environments (e.g., shape of a target, contour of a target, distance to a target, etc.) by illuminating the environment with light (e.g., laser light) and measuring the reflected light with sensors. Differences in laser return times and/or wavelengths can then be used to make digital, three-dimensional ("3D") representations of a surrounding environment. Lidar technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), etc. Depending on the application and associated field of view, multiple optical transmitters and/or optical receivers may be used to produce images in a desired resolution. A lidar system with greater numbers of transmitters and/or receivers can generally generate larger numbers of pixels.

In a multi-channel lidar device, optical transmitters can be paired with optical receivers to form multiple "channels." In operation, each channel's transmitter can emit an optical signal (e.g., laser light) into the device's environment, and the channel's receiver can detect the portion of the signal that is reflected back to the channel by the surrounding environment. In this way, each channel can provide "point" measurements of the environment, which can be aggregated with the point measurements provided by the other channel(s) to form a "point cloud" of measurements of the environment.

The measurements collected by a lidar channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal(s) reflected by the surface.

In some cases, lidar measurements may be used to determine the reflectance of the surface that reflects an optical signal. The reflectance of a surface may be determined based on the intensity of the return signal, which generally depends not only on the reflectance of the surface but also on the range to the surface, the emitted signal's glancing angle with respect to the surface, the power level of the channel's transmitter, the alignment of the channel's transmitter and receiver, and other factors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein is a lidar system and related methods for intelligent management of a space in an environment, which can be or include an indoor environment (e.g., a warehouse, a hallway, a laboratory, a store, etc.) and/or an outdoor environment (e.g., a parking area, a road, a sidewalk, an entryway, etc.). In one aspect, a computer-implemented method of monitoring the environment includes receiving, at a server computer, a first image of an environment captured by a camera. The method further includes receiving, at the server computer, a point cloud of the environment generated by at least one lidar device. The method additionally includes registering, at a server computer, at least a portion of the point cloud with at least a portion of the first image. The method additionally includes receiving, at a server computer and from a user device, a user selection of a zone in the environment based on a user interaction with a second image presented on the user device, the second image including at least one of a portion of the first image or a portion of the point cloud. The method additionally includes monitoring, at a server computer, point cloud data collected by the at least one lidar device for the selected zone.

In a second aspect, a system for monitoring an environment includes a processor, and a non-transitory memory communicatively coupled to the processor. The memory stores the instructions that, when executed by the processor, cause the processor to receive a first image of the environment captured by a camera, and receive a point cloud of the environment generated by at least one lidar device. The instructions further cause the processor to register at least a portion of the point cloud with at least a portion of the first image. The instructions additionally cause the processor to receive, from a user device, a user selection of a zone in the environment based on a user interaction with a second image presented on the user device, the second image including at least one of a portion of the first image or a portion of the point cloud. The instructions additionally cause the processor to monitor point cloud data collected by the at least one lidar device for the selected zone.

In a third aspect, an article including a non-transitory computer readable medium is described. The non-transitory computer readable medium has instructions stored thereon that, when executed by one or more computer processors, cause the one or more computer processors to perform operations for monitoring an environment. The operations include receiving a first image of an environment captured by a camera. The operations further include receiving a point cloud of the environment generated by at least one lidar device. The operations additionally include registering at least a portion of the point cloud with at least a portion of the first image. The operations additionally include receiving, from a user device, a user selection of a zone in the environment based on a user interaction with a second image presented on the user device, the second image including at least one of a portion of the first image or a portion of the point cloud. The operations additionally include monitoring point cloud data collected by the at least one lidar device for the selected zone.

In a fourth aspect, a system including a lidar sensor and a non-transitory memory communicatively coupled to a processor is described. The lidar sensor is configured to scan an environment and generate a point cloud. The non-transitory includes instructions that, when executed by the processor, cause the processor to receive data identifying a volumetric space within the environment. The volumetric space was defined by registering (i) at least a portion of the point cloud with (ii) at least a portion of a first image of the environment captured by a camera, and receiving a user selection of the volumetric space based on a user interaction with a second image presented on a user device, the second image comprising at least one of a portion of the first image or a portion of the point cloud. The instructions further cause the processor to identify, in the point cloud, a set of points corresponding to an object in the environment. The instructions additionally cause the processor to determine, based on the point cloud, that the object is inside the volumetric space and generate, based on the determination, metadata indicating that the object is inside the volumetric space.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
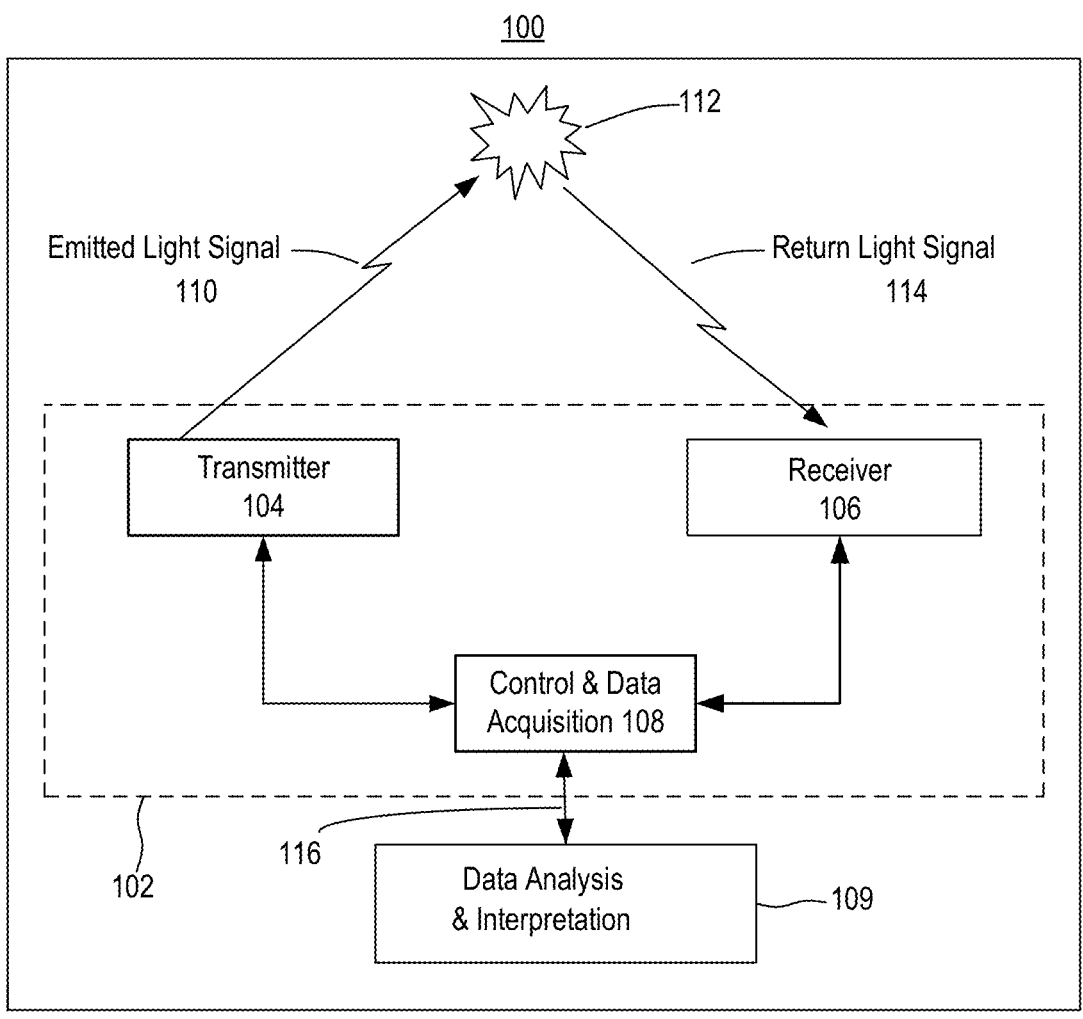
FIG. 1 is an illustration of an exemplary lidar system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

The present disclosure provides a lidar system and method for intelligent space management. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Three of the most significant technical challenges faced by the lidar industry are (1) reducing the manufacturing cost for lidar devices while maintaining existing performance levels, (2) improving the reliability of lidar devices under automotive operating conditions (e.g., weather, temperature, and mechanical vibration), and (3) increasing the range of lidar devices. One approach to reducing manufacturing costs is to reduce the amount of hardware (e.g., channels, transmitters, emitters, receivers, detectors, etc.) in the lidar device while increasing the utilization of the remaining hardware to maintain performance levels. One approach to improving device reliability is to develop lidar devices that use fewer moving mechanical parts (e.g., by eliminating or simplifying mechanical beam scanners). One approach to extending range is to develop lidar devices that use solid-state lasers.

Motivation for and Benefits of Some Embodiments

Precise monitoring of objects such as robots, vehicles, and humans can be important in many security and surveillance applications, especially when a goal is to determine locations for and detect movements of multiple objects within a large space (e.g., a warehouse or portion thereof). Current camera-based solutions can have difficulty with depth perception and may be unable to perform such tasks with precision. For instance, camera-based solutions may be unable to perform real-time processing of dense frames and can have high measurement and estimation errors. In addition, camera-based solutions can have difficulty tracking multiple moving objects.

As described herein, lidar-based surveillance can address many shortcomings of camera-based systems; however, visualizing and interacting with lidar data (e.g., a lidar point cloud) may not be intuitive for an average user. For instance, a user who is not familiar with lidar may have difficulty interpreting a lidar point cloud and/or identifying objects or features in the point cloud. In addition, potential users may be presented with few opportunities to learn how to interpret and interact with lidar data. Advantageously, the methods and systems disclosed herein can address such shortcomings by combining the measurement accuracy of lidar scanners with the ease of use and familiarity of camera-based systems, to achieve a security solution that provides superior object tracking capabilities.

Some Examples of Lidar Systems

A lidar system may be used to measure the shape and contour of the environment surrounding the system. Lidar systems may be applied to numerous applications including autonomous navigation and aerial mapping of surfaces. In general, a lidar system emits light that is subsequently reflected by objects within the environment in which the system operates. The light may be emitted by a laser (e.g., a rapidly firing laser). Laser light travels through a medium and reflects off points of surfaces in the environment (e.g., surfaces of buildings, tree branches, vehicles, etc.). The reflected (and/or scattered) light energy returns to a lidar detector where it may be sensed and used to perceive the environment.

The science of lidar systems is based on the physics of light and optics. Any suitable measurement techniques may be used to determine the attributes of objects in a lidar system's environment. In some examples, the lidar system is configured to emit light pulses (e.g., individual pulses or sequences of pulses). The time each pulse (or pulse sequence) travels from being emitted to being received ("time of flight" or "TOF") may be measured to determine the distance between the lidar system and the object that reflects the pulse. Lidar systems that operate in this way may be referred to as "pulsed lidar," "TOF lidar," "direct TOF lidar," or "pulsed TOF lidar." In some other examples, the time of flight may be calculated indirectly (e.g., using amplitude-modulated continuous wave (AMCW) structured light). Lidar systems that operate in this way may be referred to as "indirect TOF lidar" or "iTOF lidar." In still other examples, the lidar system can be configured to emit continuous wave (CW) light. The wavelength (or frequency) of the received, reflected light may be measured to determine the distance between the lidar system and the object that reflects the light. In some examples, lidar systems can measure the speed (or velocity) of objects. Lidar systems that operate in this way may be referred to as "coherent lidar," "continuous wave lidar," or "CW lidar." In a CW lidar system, any suitable variant of CW lidar sensing may be used. For example, frequency modulated continuous wave (FMCW) lidar sensing may be used.

FIG. 1 depicts the operation of a lidar system 100, according to some embodiments. In the example of FIG. 1, the lidar system 100 includes a lidar device 102, which may include a transmitter 104 that generates and emits a light signal 110, a receiver 106 that detects and processes a return light signal 114, and a control & data acquisition module 108. The transmitter 104 may include a light source (e.g., "optical emitter" or "emitter"), electrical components operable to activate (e.g., drive) and deactivate the light source in response to electrical control signals, and optical components adapted to shape and redirect the light emitted by the light source. The receiver 106 may include a light detector (e.g., "optical detector," "photodetector," or "detector") and optical components adapted to shape return light signals 114 and direct those signals to the detector. In some implementations, one or more optical components (e.g., lenses, mirrors, etc.) may be shared by the transmitter and the receiver.

The lidar device 102 may be referred to as a lidar transceiver or "channel." In operation, the emitted light signal 110 propagates through a medium and reflects off an object(s) 112, whereby a return light signal 114 propagates through the medium and is received by receiver 106. In one example, each lidar channel may correspond to a physical mapping of a single emitter to a single detector (e.g., a one-to-one pairing of a particular emitter and a particular detector). In other examples, however, each lidar channel may correspond to a physical mapping of multiple emitters to a single detector or a physical mapping of a single emitter to multiple detectors (e.g., a "flash" configuration). In some examples, a lidar system 100 may have no fixed channels; rather, light emitted by one or more emitters may be detected by one or more detectors without any physical or persistent mapping of specific emitters to specific detectors.

Any suitable light source may be used including, without limitation, one or more gas lasers, chemical lasers, metal-vapor lasers, solid-state lasers (SSLs) (e.g., Q-switched SSLs, Q-switched solid-state bulk lasers, etc.), fiber lasers (e.g., Q-switched fiber lasers), liquid lasers (e.g., dye lasers), semiconductor lasers (e.g., laser diodes, edge emitting lasers (EELs), vertical-cavity surface emitting lasers (VCSELs), quantum cascade lasers, quantum dot lasers, quantum well lasers, hybrid silicon lasers, optically pumped semiconductor lasers, etc.), and/or any other device operable to emit light. For semiconductor lasers, any suitable gain medium may be used including, without limitation, gallium nitride (GaN), indium gallium nitride (InGaN), aluminum gallium indium phosphide (AlGaInP), aluminum gallium arsenide (AlGaAs), indium gallium arsenide phosphide (InGaAsP), lead salt, etc. For Q-switched lasers, any suitable type or variant of Q-switching can be used including, without limitation, active Q-switching, passive Q-switching, cavity dumping, regenerative Q-switching, etc. The light source may emit light having any suitable wavelength or wavelengths, including but not limited to wavelengths between 100 nm (or less) and 1 mm (or more). Semiconductor lasers operable to emit light having wavelengths of approximately 905 nm, 1300 nm, or 1550 nm are widely commercially available. In some examples, the light source may be operated as a pulsed laser, a continuous-wave (CW) laser, and/or a coherent laser. A light signal (e.g., "optical signal") 110 emitted by a light source may consist of a single pulse, may include a sequence of two or more pulses, or may be a continuous wave.

A lidar system 100 may use any suitable illumination technique to illuminate the system's field of view (FOV). In some examples, the lidar system 100 may illuminate the entire FOV simultaneously. Such illumination techniques may be referred to herein as "flood illumination" or "flash illumination." In some examples, the lidar system 100 may illuminate fixed, discrete spots throughout the FOV simultaneously. Such illumination techniques may be referred to herein as "fixed spot illumination." In some examples, the lidar system 100 may illuminate a line within the FOV and use a scanner (e.g., a 1D scanner) to scan the line over the entire FOV. Such illumination techniques may be referred to herein as "scanned line illumination." In some examples, the lidar system 100 may simultaneously illuminate one or more spots within the FOV and use a scanner (e.g., a 1D or 2D scanner) to scan the spots over the entire FOV. Such illumination techniques may be referred to herein as "scanned spot illumination."

Any suitable optical detector may be used including, without limitation, one or more photodetectors, contact image sensors (CIS), solid-state photodetectors (e.g., photodiodes (PD), single-photon avalanche diode (SPADs), avalanche photodiodes (APDs), etc.), photomultipliers (e.g., silicon photomultipliers (SiPMs), and/or any other device operable to convert light (e.g., optical signals) into electrical signals. In some examples, CIS can be fabricated using a complementary metal-oxide semiconductor (CMOS) process. In some examples, solid-state photodetectors can be fabricated using semiconductor processes similar to CMOS. Such semiconductor processes may use silicon, germanium, indium gallium arsenide, lead (II) sulfide, mercury cadmium, telluride, $MoS_2$, graphene, and/or any other suitable material(s). In some examples, an array of integrated or discrete CIS or solid-state photodetectors can be used to simultaneously image (e.g., perform optical detection across) the lidar device's entire field of view or a portion thereof. In general, solid-state photodetectors may be configured to detect light having wavelengths between 190 nm (or lower) and 1.4 μm (or higher). PDs and APDs configured to detect light having wavelengths of approximately 905 nm, 1300 nm, or 1550 nm are widely commercially available.

The lidar system 100 may include any suitable combination of measurement technique(s), light source(s), illumination technique(s), and detector(s). Some combinations may be more accurate or more economical on certain conditions. For example, some combinations may be more economical for short-range sensing but incapable of provide accurate measurements at longer ranges. Some combinations may pose potential hazards to eye safety, while other combinations may reduce such hazards to negligible levels.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 or the receiver 106 determines (e.g., measures) particular characteristics of the return light signal 114 detected by the receiver 106. For example, the control & data acquisition module 108 or receiver 106 may measure the intensity of the return light signal 114 using any suitable technique.

Operational parameters of the transceiver 102 may include its horizontal field of view ("FOV") and its vertical FOV. The FOV parameters effectively define the region of the environment that is visible to the specific lidar transceiver 102. More generally, the horizontal and vertical FOVs of a lidar system 100 may be defined by combining the fields of view of a plurality of lidar devices 102.

To obtain measurements of points in its environment and generate a point cloud based on those measurements, a lidar system 100 may scan its FOV. A lidar transceiver system 100 may include one or more beam-steering components (not shown) to redirect and shape the emitted light signals 110 and/or the return light signals 114. Any suitable beam-steering components may be used including, without limitation, mechanical beam steering components (e.g., rotating assemblies that physically rotate the transceiver(s) 102, rotating scan mirrors that deflect emitted light signals 110 and/or return light signals 114, etc.), optical beam steering components (e.g., lenses, lens arrays, microlenses, microlens arrays, beam splitters, etc.), microelectromechanical (MEMS) beam steering components (e.g., MEMS scan mirrors, etc.), solid-state beam steering components (e.g., optical phased arrays, optical frequency diversity arrays, etc.), etc.

In some implementations, the lidar system 100 may include or be electronically coupled to a data analysis & interpretation module 109, which may receive outputs (e.g., via connection 116) from the control & data acquisition module 108 and perform data analysis functions on those outputs. The connection 116 may be implemented using a wireless or non-contact communication technique.

Figure 2A:
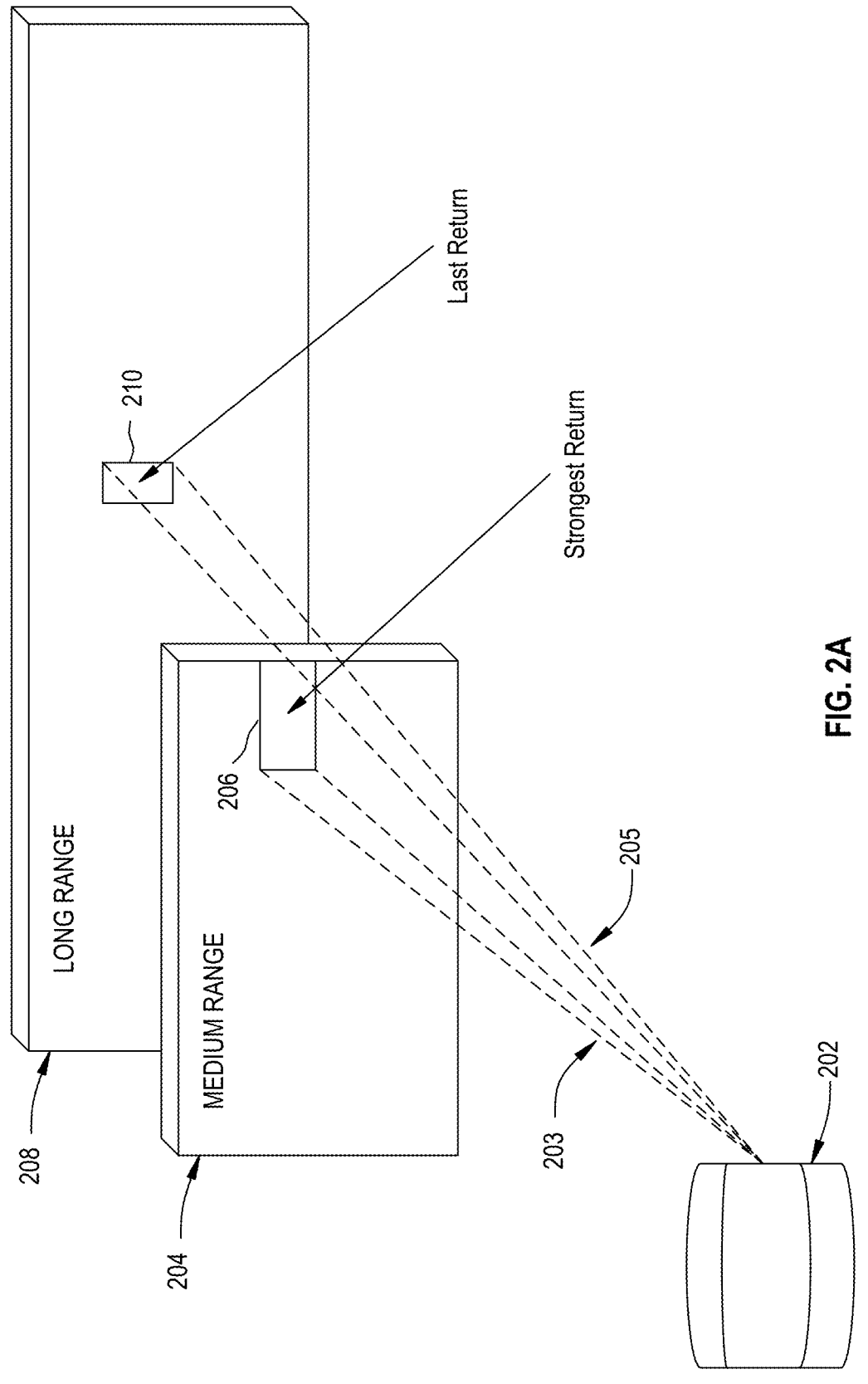
FIG. 2A is an illustration of the operation of a lidar system, in accordance with some embodiments.

FIG. 2A illustrates the operation of a lidar system 202, in accordance with some embodiments. In the example of FIG. 2A, two return light signals 203 and 205 are shown. Laser beams generally tend to diverge as they travel through a medium. Due to the laser's beam divergence, a single laser emission may hit multiple objects at different ranges from the lidar system 202, producing multiple return signals 203, 205. The lidar system 202 may analyze multiple return signals 203, 205 and report one of the return signals (e.g., the strongest return signal, the last return signal, etc.) or more than one (e.g., all) of the return signals. In the example of FIG. 2A, lidar system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter TOF and a stronger received signal strength compared with return signal 205. In both single- and multiple-return lidar systems, it is important that each return signal is accurately associated with the transmitted light signal so that one or more attributes of the object that reflect the light signal (e.g., range, velocity, reflectance, etc.) can be correctly calculated.

Some embodiments of a lidar system may capture distance data in a two-dimensional ("2D") (e.g., single plane) point cloud manner. These lidar systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the lidar system to achieve 90-180-360 degrees of azimuth (horizontal) view while simplifying both the system design and manufacturability. Many applications require more data than just a 2D plane. The 2D point cloud may be expanded to form a 3D point cloud, in which multiple 2D point clouds are used, each pointing at a different elevation (e.g., vertical) angle. Design elements of the receiver of the lidar system 202 may include the horizontal FOV and the vertical FOV.

Figure 2B:
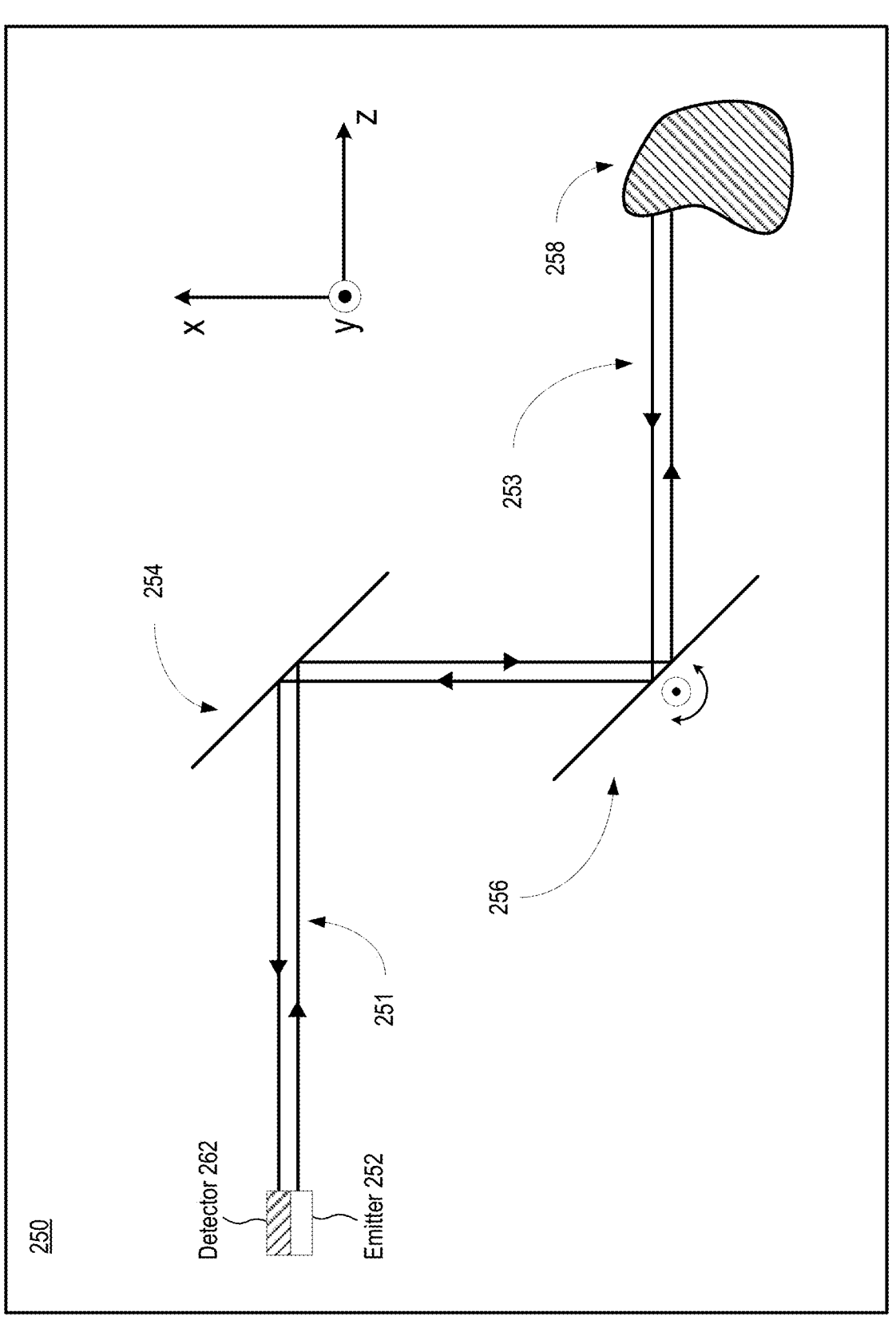
FIG. 2B is an illustration of optical components of a channel of a lidar system with a movable mirror, in accordance with some embodiments.

FIG. 2B depicts a lidar system 250 with a movable (e.g., rotating or oscillating) mirror, according to some embodiments. In the example of FIG. 2B, the lidar system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. In some embodiments, the movable mirror 256 is implemented with mechanical technology or with solid state technology (e.g., MEMS).

Figure 2C:
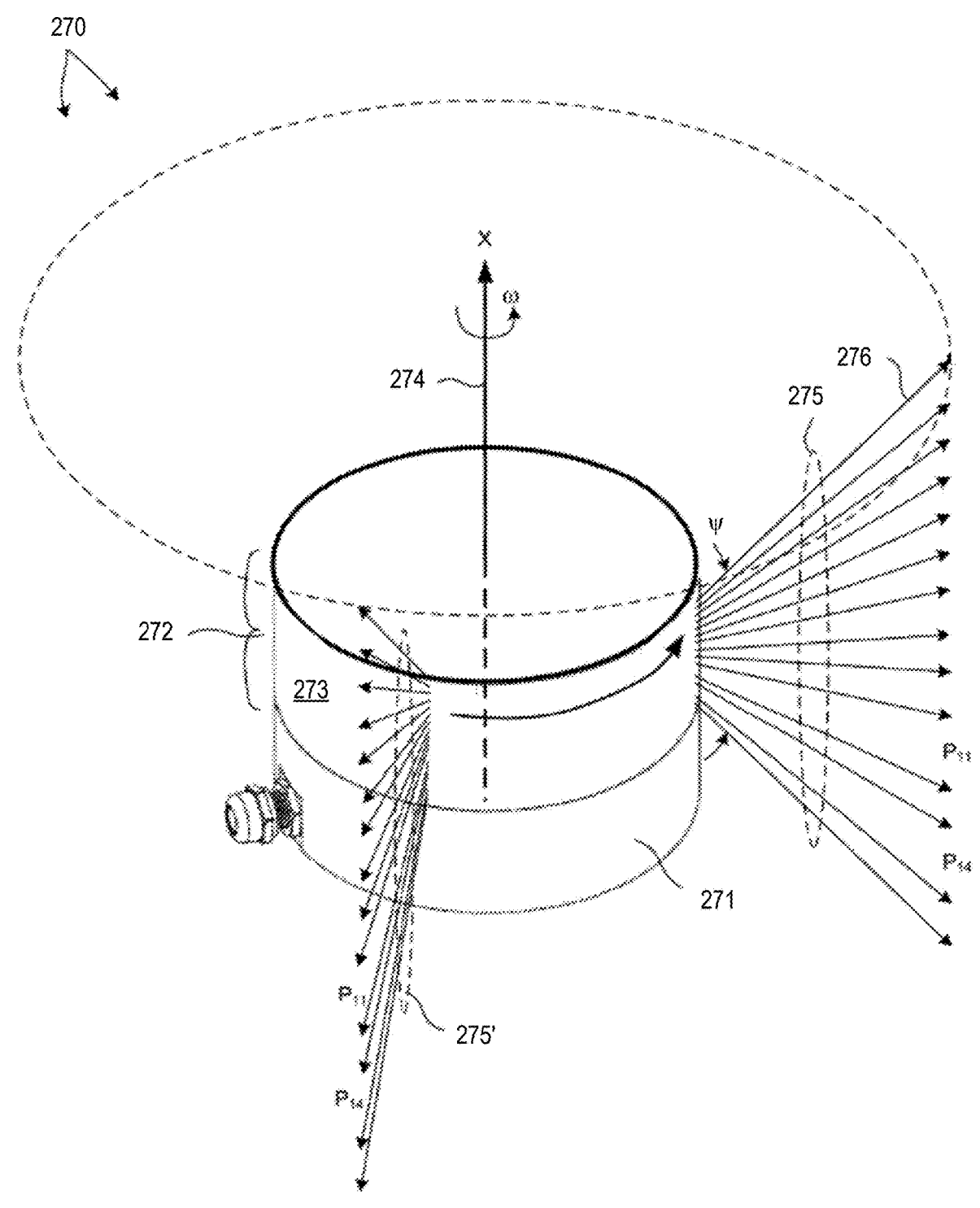
FIG. 2C is an illustration of an example of a 3D lidar system, in accordance with some embodiments.

FIG. 2C depicts a 3D lidar system 270, according to some embodiments. In the example of FIG. 2C, the 3D lidar system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D lidar system 270 includes a lidar transceiver 102 operable to emit laser beams 276 through the cylindrical shell element 273 of the upper housing 272. In the example of FIG. 2C, each individual arrow in the sets of arrows 275, 275' directed outward from the 3D lidar system 270 represents a laser beam 276 emitted by the 3D lidar system. Each beam of light emitted from the system 270 may diverge slightly, such that each beam of emitted light forms a cone of light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D lidar system 270. The direction of each emitted beam may be determined by the angular orientation ω of the transceiver's transmitter 104 with respect to the system's central axis 274 and by the angular orientation ψ of the transmitter's movable mirror 256 with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation ψ of the transmitter's movable mirror. Alternatively, the direction of an emitted beam in a vertical dimension may be determined by the transmitter's angular orientation ω, and the direction of the emitted beam in a horizontal dimension may be determined by the angular orientation ψ of the transmitter's movable mirror. (For purposes of illustration, the beams of light 275 are illustrated in one angular orientation relative to a non-rotating coordinate frame of the 3D lidar system 270 and the beams of light 275' are illustrated in another angular orientation relative to the non-rotating coordinate frame.)

The 3D lidar system 270 may scan a particular point (e.g., pixel) in its field of view by adjusting the orientation ω of the transmitter and the orientation ψ of the transmitter's movable mirror to the desired scan point (ω, ψ) and emitting a laser beam from the transmitter 104. Likewise, the 3D lidar system 270 may systematically scan its field of view by adjusting the orientation ω of the transmitter and the orientation ψ of the transmitter's movable mirror to a set of scan points $(\omega_i, \psi_j)$ and emitting a laser beam from the transmitter 104 at each of the scan points.

Assuming that the optical component(s) (e.g., movable mirror 256) of a lidar transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location LO on the detector. This time period is referred to herein as the "ranging period" or "listening period" of the scan point associated with the transmitted beam 110 and the return beam 114.

In many lidar systems, the optical component(s) of a lidar transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location LO of the spot that would have been formed absent the intervening rotation of the optical component(s) during the ranging period is referred to herein as "walk-off."

Figure 3:
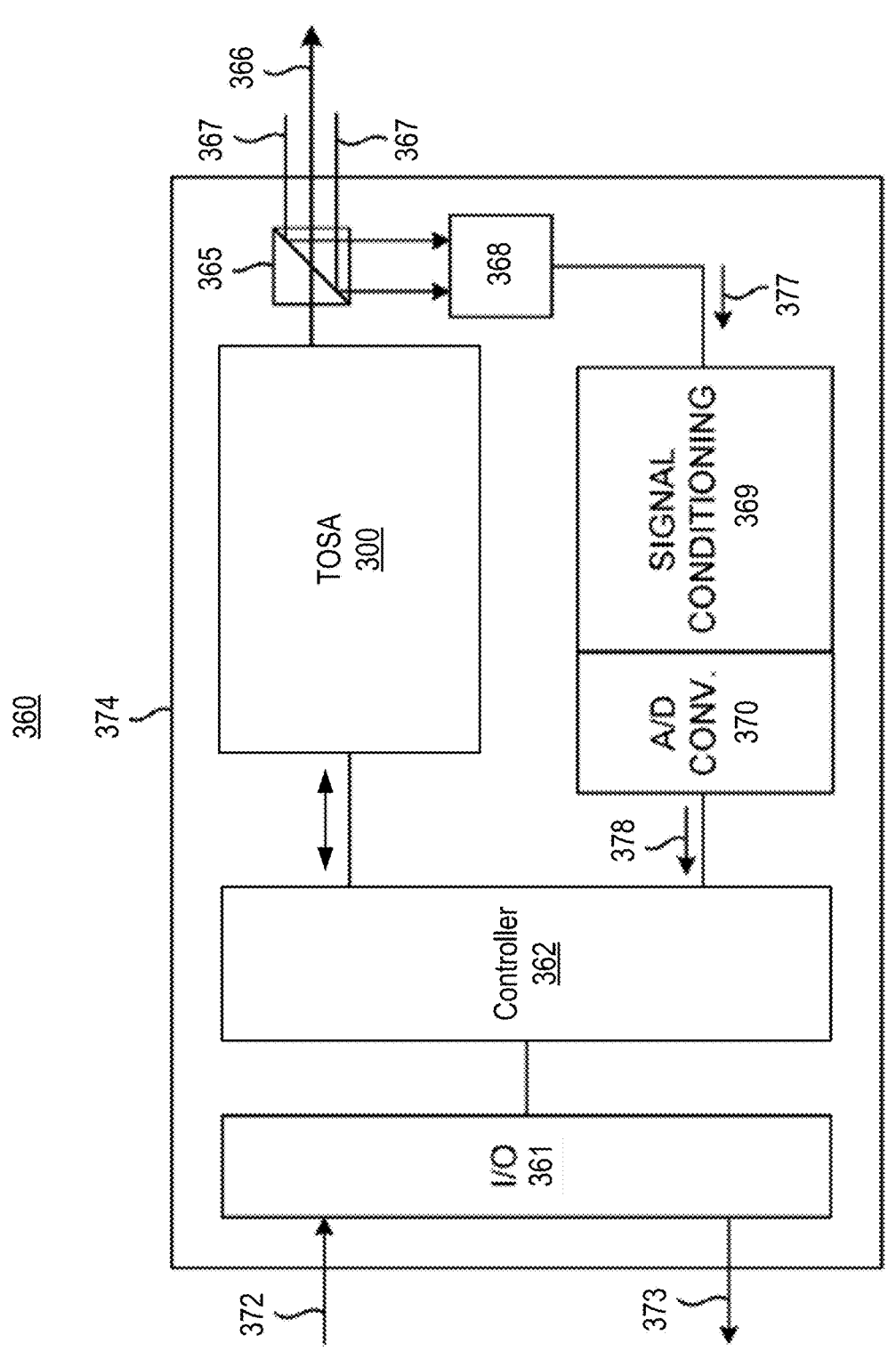
FIG. 3 is a block diagram of a transmitter-receiver optical sub-assembly (TROSA), according to some embodiments.

Referring to FIG. 3, a block diagram of a transmitter-receiver optical subassembly (TROSA) 360 is shown, according to some embodiments. In some embodiments, the TROSA 360 may include a TOSA 300, an optical detector 368, a beam splitter 365, signal conditioning electronics 369, an analog to digital (A/D) converter 370, controller 362, and digital input/output (I/O) electronics 361. In some embodiments, the TROSA components illustrated in FIG. 3 are integrated onto a common substrate 374 (e.g., printed circuit board, ceramic substrate, etc.). In some embodiments, the TROSA components illustrated in FIG. 3 are individually mounted to a common substrate 374. In some embodiments, groups of these components are packaged together and the integrated package(s) is/are mounted to the common substrate.

The TOSA 300 may include one or more light sources and may operate the light source(s) safely within specified safety thresholds. A light source of the TOSA may emit an optical signal (e.g., laser beam) 366.

A return signal 367 may be detected by the TROSA 360 in response to the optical signal 366 illuminating a particular location. For example, the optical detector 368 may detect the return signal 367 and generate an electrical signal 377 based on the return signal 367. The controller 362 may initiate a measurement window (e.g., a period of time during which collected return signal data are associated with a particular emitted light signal 366) by enabling data acquisition by optical detector 368. Controller 362 may control the timing of the measurement window to correspond with the period of time when a return signal is expected in response to the emission of an optical signal 366. In some examples, the measurement window is enabled at the time when the optical signal 366 is emitted and is disabled after a time period corresponding to the time of flight of light over a distance that is substantially twice the range of the lidar device in which the TROSA 360 operates. In this manner, the measurement window is open to collect return light from objects adjacent to the lidar device (e.g., negligible time of flight), objects that are located at the maximum range of the lidar device, and objects in between. In this manner, other light that does not contribute to a useful return signal may be rejected.

In some embodiments, the signal analysis of the electrical signal 377 produced by the optical detector 368 is performed by the controller 362, entirely. In such embodiments, the signals 373 provided by the TROSA 360 may include an indication of the distances determined by controller 362. In some embodiments, the signals 373 include the digital signals 378 generated by the A/D converter 370. These raw measurement signals 378 may be processed further by one or more processors located on board the lidar device or external to the lidar device to arrive at a measurement of distance. In some embodiments, the controller 362 performs preliminary signal processing steps on the signals 378 and the signals 373 include processed data that are further processed by one or more processors located on board the lidar device or external to the lidar device to arrive at a measurement of distance.

In some embodiments a lidar device (e.g., a lidar device 100, 202, 250, or 270) includes multiple TROSAs 360. In some embodiments, a delay time is enforced between the firing of each TROSA and/or between the firing of different light sources within the same TROSA. In some examples, the delay time is greater than the time of flight of the light signal 366 to and from an object located at the maximum range of the lidar device, to reduce or avoid optical cross-talk among any of the TROSAs 360. In some other examples, an optical signal 366 is emitted from one TROSA 360 before a return signal corresponding to a light signal emitted from another TROSA 360 has had time to return to the lidar device. In these embodiments, there may be sufficient spatial separation between the areas of the surrounding environment interrogated by the light signals of these TRO-SAs to avoid optical cross-talk.

In some embodiments, digital I/O 361, A/D converter 370, and signal conditioning electronics 369 are integrated onto a single, silicon-based microelectronic chip. In another embodiment, these same elements are integrated into a single gallium-nitride or silicon based circuit that also includes components of the TOSA 300 (e.g., an illumination driver). In some embodiments, the A/D converter 370 and controller 362 are combined as a time-to-digital converter.

As depicted in FIG. 3, return light 367 reflected from the surrounding environment is detected by optical detector 368. In some embodiments, optical detector 368 includes one or more avalanche photodiodes (APDs) and/or single-photon avalanche diodes (SPADs). Any suitable optical detector may be used. In some embodiments, optical detector 368 generates an output signal 377 that is amplified by signal conditioning electronics 369. In some embodiments, signal conditioning electronics 369 include an analog trans-impedance amplifier. However, in general, the amplification of output signal 377 may include multiple amplifier stages. In this sense, an analog transimpedance amplifier is provided by way of non-limiting example, as many other analog signal amplification schemes may be used.

In some embodiments, the amplified signal is communicated to A/D converter 370, and the digital signals generated by the A/D converter are communicated to controller 362. Controller 362 may generate an enable/disable signal to control the timing of data acquisition by ADC 370.

As depicted in FIG. 3, the optical signal 366 emitted from the TROSA 360 and the return signal 367 directed toward the TROSA 360 share a common path within the lidar device. In the embodiment depicted in FIG. 3, the return light 367 is separated from the emitted light 366 by a beam splitter 365. The beam splitter may direct the light 366 emitted by the TOSA 300 toward the lidar device's environment, and direct the return light 367 to the optical detector 368. Any suitable beam splitter may be used, including (without limitation) a polarizing beam splitter, nonpolarizing beam splitter, dielectric film, etc.). Some non-limiting examples of suitable beam splitters are described in International Patent Publication No. WO 2017/164989.

Intelligent Space Management System

Figure 4A:
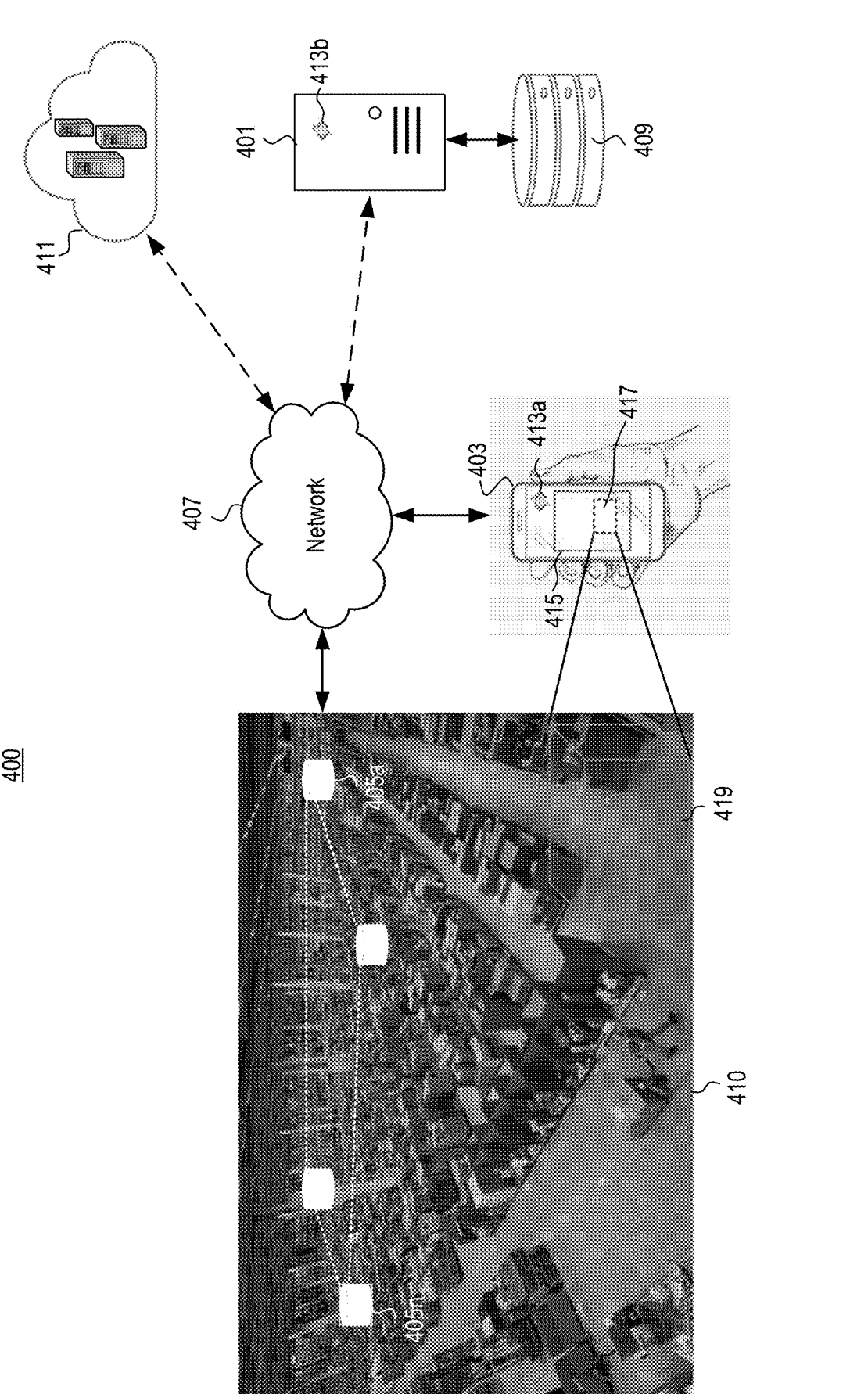
FIG. 4A is an illustration of an example of an intelligent space management system, in accordance with some embodiments.

FIG. 4A is an illustration of an example of an intelligent space management system 400, in accordance with some embodiments. The intelligent space management system 400 may include a server 401, a user device 403, a set of lidar devices 405a . . . 405n (collectively or individually referred to as lidar device 405), and a network 407 for setting up communications between different components included in the intelligent space management system 400.

According to one embodiment, the set of lidar devices 405 may be configured to monitor an area or environment, such as an indoor warehouse 410, as depicted. At one timepoint, a user (e.g., a manager of the warehouse) may want to monitor a specific zone 419 inside the warehouse 410, and the user may use the user device 403 to capture an image, a series of images, and/or a video that covers the specific zone 419. Once captured, the image and/or video may be sent from the user device 403 to the server 401. The server 401 may also receive a point cloud for the warehouse 410 and the zone 419 from the lidar devices 405. The server 401 may then generate an overlay of an image from the user device 403 (e.g., a frame from a video) with the point cloud from the lidar devices 405.

In some examples, the overlay can be generated by registering or aligning the image (or video) with the point cloud (e.g., from a perspective of a camera when the image was captured). For example, the overlay may be or include a fusion of the image with the point cloud (e.g., from the camera's perspective), such that objects or features from the image and the point cloud are registered or aligned with one another. In some examples, the overlay can include information that defines how to achieve the fusion of the image and the point cloud, such as information that defines how to transform the point cloud datapoints in 3D space to correspond to a position and/or perspective of the camera. Additionally or alternatively, the overlay can include a new image (an overlay image) in which the image captured by the camera, the point cloud, or any portions thereof are combined (e.g., with point cloud datapoints superimposed over the image).

Once generated, the overlay may be sent from the server 401 to the user device 403 and presented to the user on a user interface 415 of the user device 403 (e.g., a UI of a smartphone app). The user may then select a region 417 corresponding to the zone 419 in the presented overlay, to indicate that the user wishes to monitor the zone 419. In alternative examples, rather than selecting the region 417 in a presentation of the overlay, the user can select the region 417 in a presentation of (i) the image captured the user device 403, (ii) the point cloud from the lidar devices 405, or (iii) any portion or combination thereof. The user's zone selection may be transmitted back to the server 401, which can convert the selection to a three-dimensional (3D) volumetric space or bounding box corresponding to the zone 419. The server 401 may then instruct the lidar devices 405 to monitor the bounding box corresponding to the zone 419.

Advantageously, with the intelligent space management system 400 disclosed herein, a user having minimal technical skills and wishing to use lidar to monitor an environment can do so by capturing an image of the environment (e.g., using a smartphone) and selecting a desired zone in the image (e.g., optionally overlaid with a lidar point cloud). The user does not need to interpret or interact directly with point cloud data, and each operation for selecting a zone is intuitive for a non-technical user. The specific functions of each component included in the intelligent space management system 400 are described in further detail below.

In various examples, user device 403 may include a virtual or physical computer processor(s), memory, a communication interface(s) or device(s), etc., which, along with other components of the user device, are configured to implement certain functions related to the intelligent space management system 400. The user device 403 may be or include a camera to capture an image/video for an area (e.g., zone 419 in the warehouse 410) a user wishes to monitor. In some embodiments, the user device 403 may not include a camera but may instead utilize or receive an image/video from another imaging device, which may capture the image/video of the area. The communication interface(s) or device(s) can be used for sending and receiving data to and from other components in the system 400, such as lidar devices 405 and/or the server 401. For example, the user device 403 may send an image to the server 401 and may receive an overlay from the server 401.

In some embodiments, the user device 403 may further include certain software applications for processing an image (or video) captured by the camera of the user device (or received from other imaging devices or instruments). For example, the user device 403 may include an instance of intelligent space management application 413*a* configured for intelligent space management. The instance of intelligent space management application 413*a* may process the image or video captured by the user device 403 and/or may publish the image to the network 407. The instance of intelligent space management application 413*a* may display an overlay or at least a portion of the image and/or point cloud on the user device 403, as described herein.

In some embodiments, the instance of intelligent space management application 413*a* may provide the user interface 415, which may present lidar data (e.g., a point cloud) to a user associated with the user device 403. The user interface 415 may allow the user to control or operate the lidar devices 405, such as activating or deactivating the lidar devices 405 and/or specifying light emitting parameters or certain operational parameters (e.g., emitted pulse patterns or signal processing). The user interface 415 may allow the user to select one or more options for displaying the lidar data. For instance, the user interface 415 may be used to display image data and/or lidar data as a single frame snapshot image, a live video image, an accumulated image of data over time (e.g., on a map), and/or a projected view of a three-dimensional environment. The user interface 415 can add color, texture, or similar effects to displayed images and/or can provide a display of light intensity measurements for some or all pixels in one or more images. In some embodiments, the user interface 415 can allow a user to track activities or movements of objects in a monitored area (e.g., the zone 419) and can provide alerts to the user or other party responsible for managing the area. In some embodiments, the user interface 415 may include multiple user interfaces that implement a variety of functions, such as, for example, monitoring a lidar device, monitoring a camera, displaying lidar data, displaying an image/video, or displaying a lidar data/image fusion, overlay, or a combination of the image/video and lidar data. Each of these functions can be provided in a respective user interface 415.

In some embodiments, the user device 403 may include multiple devices that provide different functionality. For instance, the user device 403 may include a camera for capturing an image/video of the environment and one or more displays for displaying the image/video, lidar data (e.g., the point cloud), and/or an overlay or a fusion of the image/video and lidar data. Non-limiting examples of the user device 403 can include a laptop computer, a desktop computer, a tablet computer, a mobile telephone, a smartphone, a personal digital assistant (PDA), a mobile email device, or any other electronic device.

Still referring to FIG. 4A, the server 401 may include an instance of intelligent space management application 413*b* configured for monitoring an area using data received from the user device 403 and lidar devices 405. The server 401 may be implemented according to executable code and/or associated server components used to support the functionalities of the server 401. In some embodiments, the server 401 may include or may be coupled to a repository or data store 409 for storing data related to space management. The data store 409 may include one or more non-transitory computer-readable media, and may collectively comprise logical data, executable code, instructions, and/or associated components to support storage, data management, and retrieval of data. The data in the data store 409 may include, for example, image or video data (e.g., captured by the user device 403 or other imaging devices), lidar data (e.g., obtained by the lidar devices 405), and/or data generated from the image data, video data, and lidar data. The image or video data may relate to an indoor area (e.g., warehouse 410) or an outdoor environment monitored by the lidar devices 405. In some embodiments, the data store 409 and/or the intelligent space management application 413*b* may reside on a single server or may be distributed across multiple servers 411 in one or more locations (e.g., in a distributed cloud environment).

In some embodiments, the server 401 may possess larger computing/communication capabilities and computing resources than the user device 403, and therefore may be able to perform more complex computations or communications, compared to the user device 403. For example, the steps of generating the overlay and converting a user-selected 2D region to a 3D volumetric space may be performed on the server 401, while the step of receiving the user selection of the 2D region may be performed on the client device 403. Using the server 401 to perform more complicated processes can greatly reduce requirements for computing resources, network bandwidth, and power for the client device 403, thereby improving efficiency of the system 400.

In some embodiments, the server 401 may be configured to communicate with the client device 403 and/or the lidar devices 405. For example, the server 401 may send an alert to the user device 403 or other user device when an unusual event is detected in a monitored area (e.g., in the monitored zone 419 inside the warehouse 410). In another example, the server 401 may send an instruction to the lidar devices 405 to define or adjust an area to be monitored by the lidar devices 405. Such communications may be executed over the network 407, and/or through direct device-to-device information exchanges, such as over a local pairing or network connection (e.g., BLUETOOTH, near-field communication, infrared, etc.). In alternative examples, some or all of the functions described herein as being performed by the server 401 may be performed partially or completely by the user device 403, and thus a server 401 may be included or not be included in the intelligent space management system 400. Alternatively or additionally, one or more of the functions described herein as being performed by the user device 403 may be performed partially or completely by the server 401.

Lidar devices 405 may be or include any lidar device described herein for generating a point cloud for an environment. Depending on the size (e.g., radius, width, length, depth, and/or volume) of the area to be monitored, the lidar devices 405 may have any number of devices and/or configurations. For example, the lidar devices 405 may include one type of laser transmitter and/or photodetector when monitoring a large area and a different type of laser transmitter and/or photodetector when monitoring a small area. In some embodiments, only one lidar device may be needed to monitor an area. Alternatively, to provide a more comprehensive scan of the area (e.g., a larger point cloud or a more dense point cloud), multiple lidar devices 405 may be included in the intelligent space management system 400, for example, with each lidar device 405 monitoring the area from a different perspective. For instance, multiple lidar devices 405 (e.g., two, three, four, five, six, or more lidar devices) may be used to monitor the warehouse 410 and may be installed at a variety of viewing locations (e.g., near corners of the warehouse 410).

In some embodiments, the lidar devices 405 may be mounted in fixed positions and/or orientations or may be movable. For instance, the lidar devices 405 may be mounted at four corners of the warehouse 410 and/or may not change their orientations after the mounting. This can allow the lidar devices 405 to monitor the entire warehouse 410 from consistent orientations. Alternatively, the lidar devices 405 may be configured to change a scan area after installation (e.g., using a motor in a mounting device). For instance, the lidar devices 405 may receive instructions to change their orientations to scan a different location (e.g., the zone 419). The instructions may be received from the server 401, the user device 403, or other components of the system 400.

In some embodiments, the lidar devices 405 or an associated processor(s) may generate one or more point clouds based on data obtained by the lidar devices. A point cloud may be generated for each lidar device 405 individually and/or may be generated by combining lidar data obtained from multiple lidar devices 405. A variety of techniques can be utilized to merge point cloud data obtained from different lidar devices 405. In one example, point cloud data can be transformed from a local coordinate system for a lidar device 405 to a global coordinate system for the environment (e.g., the warehouse 410). This may include transforming the point clouds from two or more lidar devices 405 to the same coordinate system.

In some embodiments, the lidar devices 405 may publish or send the lidar data (e.g., generated point clouds) to the network 407, to allow other components (e.g., the server 401) to obtain and process the lidar data. The lidar devices 405 may publish the lidar data to the network 407 through a wired or wireless communication.

Network 407 may have a variety of configurations, including, for example, a star configuration, a token ring configuration, or other configurations. For instance, the network 407 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 407 may be coupled to or include portions of a telecommunications network for sending data in a variety of different communication protocols. In some implementations, the network 407 includes BLUETOOTH communication networks or a cellular communications network for sending and receiving data including via short messaging service (SMS), multimedia messaging service (MMS), hypertext transfer protocol (HTTP), direct data connection, wireless application protocol (WAP), email, etc.

In some embodiments, the network 407 may include multiple wired or wireless networks that each is responsible for communication between components of the system 400. For instance, the network 407 may include a first network for communication between the multiple lidar devices 405, a second network for communication between the user device 403 and the lidar devices 405, and a third network for communication between the server 401 and the user device 403 and/or the lidar devices 405. These communications are described in further detail with reference to FIG. 4B.

Figure 4B:
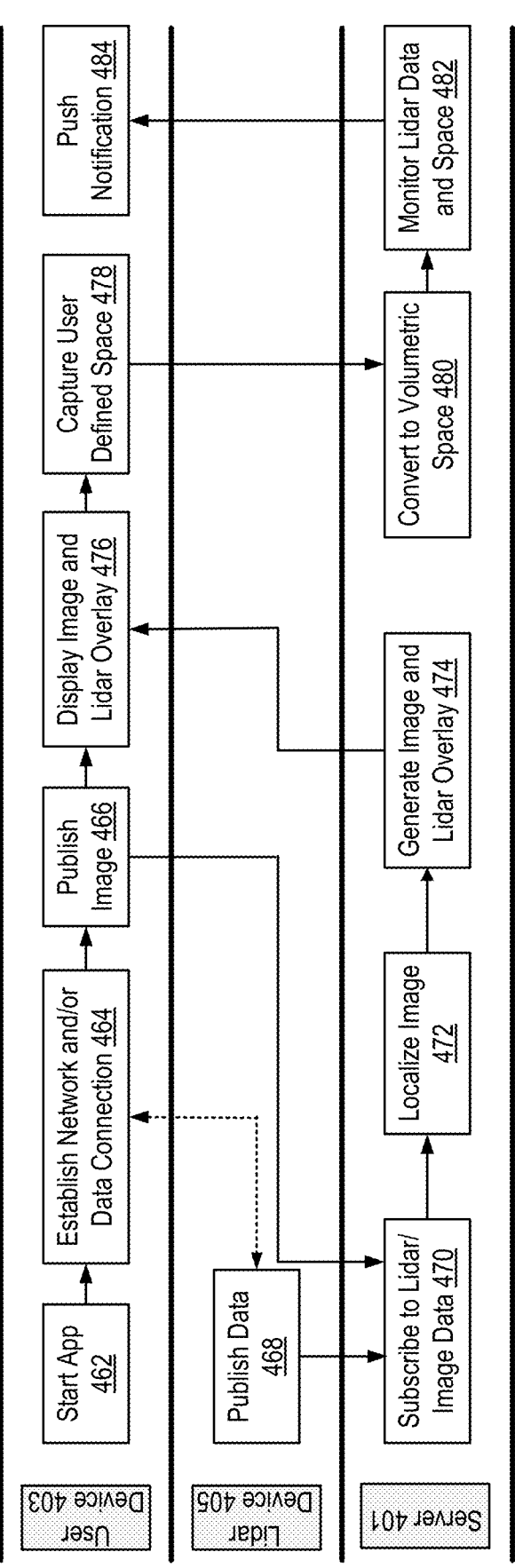
FIG. 4B is an illustration of a progress flow for space management using lidar and image data, in accordance with some embodiments.

FIG. 4B is an illustration of a progress flow 450 for space management using lidar and image/video data, in accordance with some embodiments. As illustrated, the progress flow 450 may be implemented by different components of an intelligent space management system (e.g., the intelligent space management system 400). For example, the progress flow 450 may be implemented by the user device 403, the lidar devices 405, and the server 401, as depicted.

The progress flow 450 may start at step 462 when a user starts an app on the user device 403 (e.g., the instance of intelligent space management application 413a). Starting the app can indicate that the user intends to monitor an area (e.g., the zone 419 in the warehouse 410) using the lidar devices 405.

At step 464, the user device 403 may establish a network and/or data connection (e.g., to network 407) to allow the user device 403 to communicate with other system components. For instance, the network connection may allow the user device 403 to obtain lidar data from the lidar devices 405 (e.g., to process or display a point cloud) and/or may allow the user device 403 to publish an image (or video) to the server 401.

At step 466, the user device 403 may publish an image (or video) to the server 401. The image may be captured through a camera in or accessed by the user device 403. Alternatively, the image may be captured by another device, such as a standalone camera, and then forwarded to the user device 403. The captured image may include the area the user wishes to monitor using the lidar devices 405.

At step 468, the lidar devices 405 may publish lidar data to the server (e.g., using the network 407). The lidar data may include a point cloud generated for an area scanned by the lidar devices 405 (e.g., the warehouse 410). In some embodiments, the point cloud may be or include points in 3D space. One or more colors may be assigned to the points, for example, by elevation, intensity, return number, or classification. In some embodiments, point cloud layers can be displayed in a 3D view as 3D points. In some embodiments, a point cloud may be generated by combining lidar data from multiple files or lidar devices 405.

At step 470, the data published by the user device 403 and the lidar devices 405 may be received by the server 401, for instance, when the server 401 subscribes to the lidar data published by the lidar devices 405 and the image published by the user device 403. A publish/subscribe (pub/sub) model can be used for data exchanges between different system components. This can make the communication infrastructure more scalable, flexible, and maintainable. Additionally or alternatively, the pub/sub model can avoid a need to explicitly establish dependencies among interacting system components and/or can facilitate adoption of certain security means that protect data exchanges and prevent attacks by data hackers.

At step 472, the server 401 may localize or register the image with the point cloud. This may include, for example, correlating features and/or objects in the image with corresponding features and/or objects in the point cloud. Alternatively or additionally, localizing or registering the image with the point cloud can include aligning or fusing at least a portion of the point cloud with at least a portion of the image (e.g., from a perspective of the camera when the image was captured). This can include, for example, determining a location and viewing angle of the camera when the image was captured and/or transforming the point cloud data from a coordinate system for a lidar device to a coordinate system for the camera (e.g., early fusion). Alternatively or additionally, the fusion can be generated by aligning one or more objects in the image with one or more respective objects in the point cloud (e.g., a late fusion).

Figure 5A:
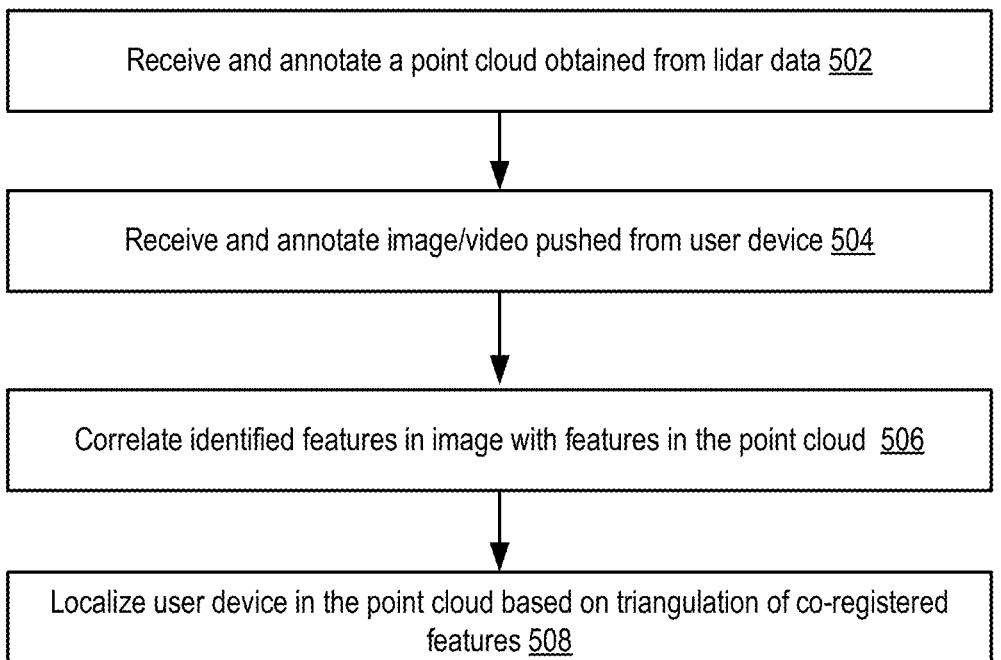
FIG. 5A is a flowchart of an example method of localizing an image on a point cloud, in accordance with some embodiments.

For example, FIG. 5A is a flowchart of an example method 500 of localizing the image (or a frame from a video) on the point cloud. In some embodiments, timestamps may be applied to identify a camera image that corresponds to the point cloud. At step 502, the point cloud (e.g., generated by the lidar devices 405) can be received and annotated (e.g., by the server 401). The annotations can identify one or more features or objects in the point cloud. Certain annotation tools can be used to annotate the point cloud, such as, for example, 3D box annotation for object detection, 3D segmentation for capturing the motion of an objection in a video, objection classification for identifying and/or classifying all the objects, lane detection for distinguishing between the various lines and road demarcations in an image with polylines, landmark annotation for determining different sized objects, polygon annotations for identifying specific objects, such as logos, signboards, and even different postures of humans, etc. Machine learning algorithms can be used to detect the objects and features with or without assistance from the annotation tools. Based on the annotation tools and/or machine learning algorithms, objects and features (e.g., humans, carts, boards, cubicles, traffic lanes, goods, and the like) can be identified in the point cloud.

Figure 6A:
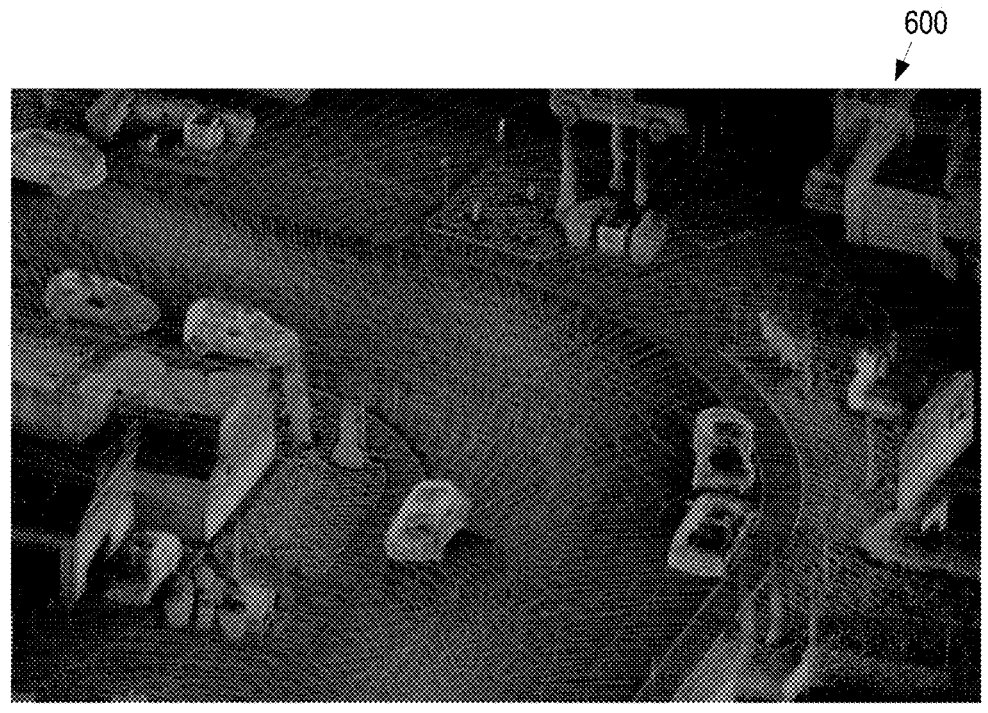
FIG. 6A is an illustration of an example point cloud, in accordance with some embodiments.
Figure 6B:
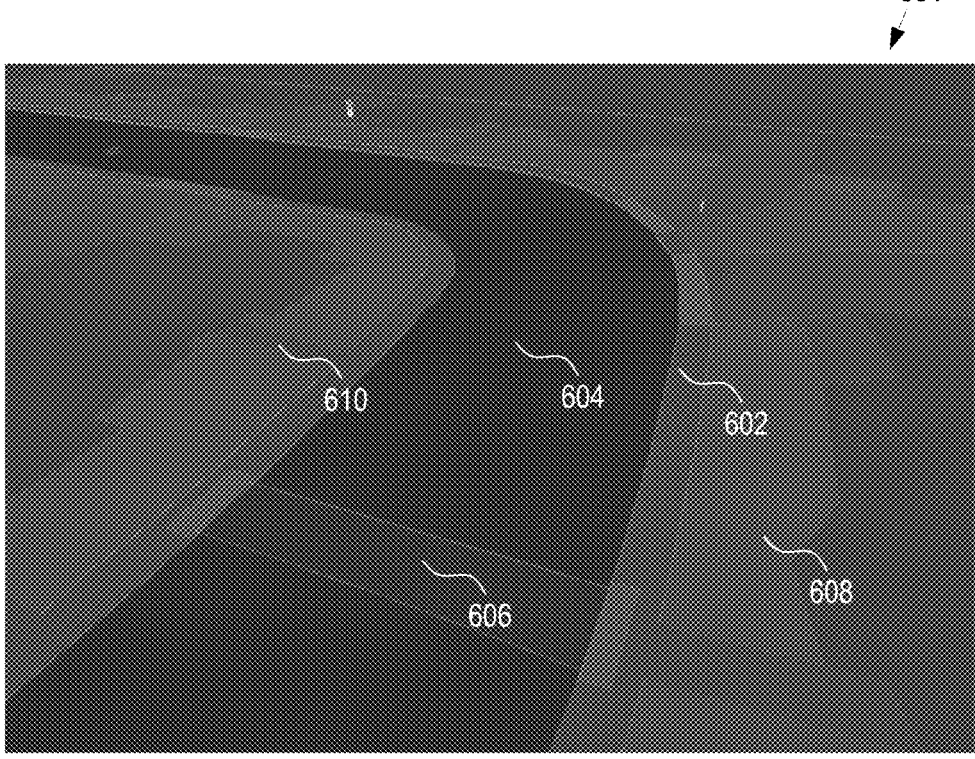
FIG. 6B is an illustration of an example schematic map generated based on point cloud, in accordance with some embodiments.

For example, FIG. 6A is an illustration of an example point cloud 600 and FIG. 6B is an illustration of an example semantic map 601 generated based on the point cloud of FIG. 6A. As illustrated, the semantic map include annotations for various objects and features of the point cloud 600, such as sidewalks 602, roads 604, crosswalks 606, lawns 608, and driveways 610. Other objects and features in the point cloud 600 could be similarly annotated.

Referring again to FIG. 5A, at step 504, the image (e.g., captured by the user device 403) can likewise be received and annotated (e.g., by the server 401). Objects and/or features can be identified in the image (e.g., by the server 401 and/or the user device 403) using segmentation, object classification, and/or machine learning models trained for object/feature detection and/or classification. In some embodiments, ray tracing may be utilized to simulate lidar light paths for the identified objects/features.

At step 506, features/objects in the image may be correlated with features/objects in the point cloud (e.g., using the server 401). To achieve this, a similarity measurement function may be utilized to search for corresponding features between the two sources based on a similarity identified between the image and point cloud. To improve the accuracy of the similarity measurement function, the 3D point cloud may be first converted to a 2D intensity image or a distance image. The similarity measurement may be then performed between the 2D optical image from the camera and the 2D intensity or distance image generated from the 3D point cloud.

At step 508, the image may be localized on the point cloud based on a triangulation from co-registered features. Here, the co-registered features may be the correlated features between the point cloud and the image (e.g., based on the similarity measurement in step 506). Once the co-registered features are found, the image/video can be localized on the point cloud by placing the co-registered features (e.g., points, lines, and so on) in the same locations. In some embodiments, a scale of the image may be adjusted to match a scale of the point cloud when localizing the point cloud on the image.

In some embodiments, triangulation may be utilized to identify a location of the camera when the image was captured. Triangulation is generally an intersection technique for determining an unknown geographic location by measuring angles with respect to known positions. For example, triangulation can be performed using three or more lines of known positions to determine the location of the camera. In some embodiments, the determined location of the camera may be placed on a coordinate system used for the point cloud.

Referring again to FIG. 4B, the server 401 may generate an overlay for the image and the point cloud at step 474. In some examples, the overlay may be created when the image and the point cloud are localized or registered at step 472. Alternatively or additionally, the overlay can include a new image that that combines at least a portion of the original image (captured by the camera) and a portion of the point cloud. For example, the overlay can include an image representing a fusion of the original image and the point cloud, or portions thereof.

Figure 5B:
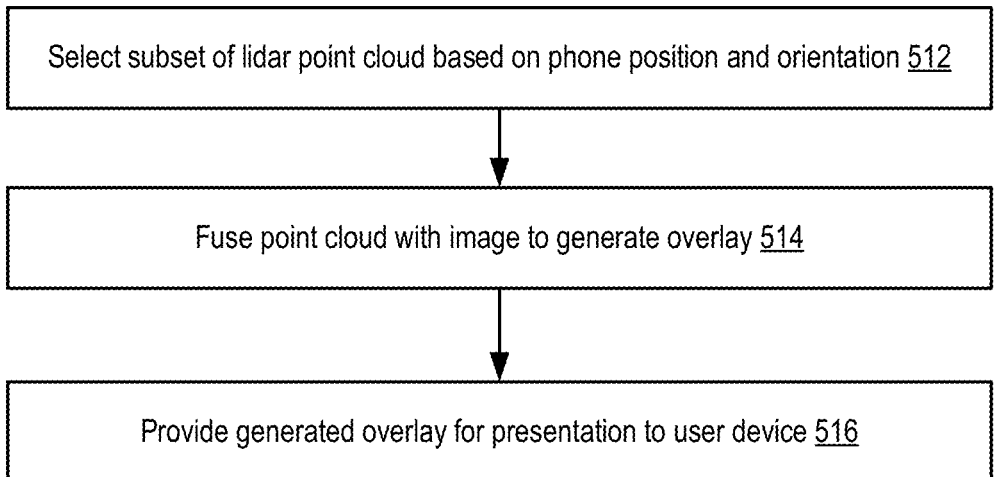
FIG. 5B is a flowchart of an example method of generating an overlay of an image and a point cloud, in accordance with some embodiments.

For example, FIG. 5B is a flowchart of an example method 510 of generating the overlay, in accordance with certain embodiments. The method can be used to determine a subset of the point cloud that is to be fused with (e.g., superimposed on) the image. In various examples, generating the overlay can include: determining a position and perspective of the camera when the image was captured; identifying datapoints in the point cloud corresponding to surfaces in the environment that are visible in the image; and overlaying the identified datapoints onto the image, as seen from the position and perspective of the camera.

For example, at step 512, a subset of the point cloud can be selected (e.g., by the server 401) based on the position and orientation of the camera when the image was taken. The orientation of the camera may be determined, for example, based on the position of the camera as well as an alignment of the image with the point cloud. After the location and orientation of the camera are determined, the point cloud may be rendered for presentation from a point-of-view of the camera (e.g., corresponding to the location and orientation of the camera). The subset of the point cloud may be then determined based on the point-of-view of the camera. In some examples, the subset may be or include datapoints in the point cloud corresponding to surfaces in the environment that are visible in the image. For example, the subset may not include point cloud datapoints corresponding to surfaces that are not visible in the image.

At step 514, the determined subset of the point cloud can be fused with the image to generate an overlay (e.g., using the server 401). This may include matching and aligning common objects/features in the image and the point cloud (e.g., in a common coordinate system) and/or superimposing the subset of the point cloud over the image. In some embodiments, an image of the overlay may be smoothed, filtered, or de-noised before being viewed by a user (e.g., on the user device 403). At step 516, the image of the overlay may be displayed on a user device (e.g., the user device 403) in a user interface that allows a user to view and interact with the overlay.

Referring again to FIG. 4B, after generating the overlay at step 474, the server 401 sends the overlay or image of the overlay to the user device 403 and, at step 476, the user device 403 displays the overlay for the user. In some embodiments, the overlay includes point cloud data superimposed over the image, as described herein. Additionally or alternatively, the overlay may include point cloud data superimposed over a video, which can be or include, for example, a live stream of video being captured by the user device 403 and/or current point cloud data obtained using the lidar devices 405. In some embodiments, the overlay may be fed to the user device 403 from the server 401 through a video streaming process. In some embodiments, only a portion of the overlay (e.g., a subset of video frames) may be sent to the user device. Use of a video fusion or overlay can allow a user to view a camera feed and/or superimposed point cloud data on the user device 403 in real time. In alternative examples, the user device 403 can display the image captured by the camera or a portion thereof with no point cloud data superimposed over the image.

At step 478, the user device 403 may receive user input to select a zone in the overlay for monitoring. The user interface on the user device 403 may enable the user to select one or more regions or portions of the overlay (e.g., a user-defined area), e.g., by tapping and/or dragging a finger on a display. For example, the user can use the user interface to draw a box, rectangle, circle, triangle, or other shape around a region of interest in the overlay or image of the overlay (e.g., the zone 419). If the overlay includes a video, the user may draw the shape over a frame in the video (e.g., the last frame). For example, the user can pause the video at a desired frame and draw the shape. In some embodiments, after receiving the user input, the user device 403 may transmit the zone selection or the overlay with the selected zone to the server 401. In alternative examples, the user can select the zone by interacting with a display of the image captured by the camera (or a portion thereof), with no point cloud data superimposed over the image.

At step 480, the server 401 may convert the selected zone to a volumetric space or bounding box for monitoring. The volumetric space can be or include, for example, a 3D region in the environment (e.g., 3D box, a rectangular cuboid, a sphere, a pyramid, or other shape) that encompasses the zone selected or drawn by the user and/or encompasses any point cloud data corresponding to the selected zone. For example, when the shape is a rectangular cuboid, the server can determine corner locations for the cuboid such that the cuboid encompasses (e.g., tightly) the selected zone. Alternatively or additionally, the server 401 may define the volumetric space according to one or more objects that are present in the environment. For instance, the zone selected by the user may correspond to an object (e.g., a crosswalk on a road, a door, a shelf or hallway in a warehouse, etc.), and the volumetric space can be defined to encompass the object and/or have a boundary corresponding to the object (e.g., a volumetric space having crosswalks or other objects as boundaries). For example, the user can select a hallway (or other object) and the volumetric space can be defined according to dimensions of the hallway (or other object). The volumetric space can be smoothed (e.g., to suppress derivatives), for example, using a Gaussian smoothing filter or other type of filter. In some examples, after the volumetric space is determined, point cloud data inside the volumetric space can be monitored and point cloud data outside the volumetric space can be ignored.

Figure 7A:
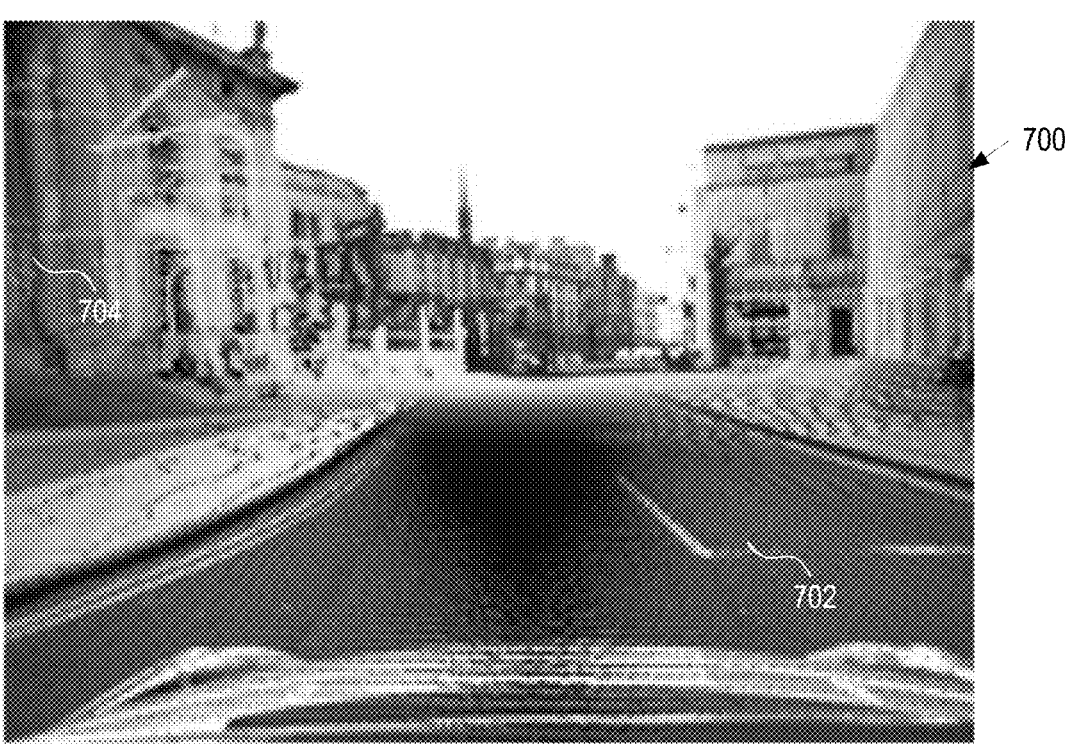
FIG. 7A is an illustration of an example overlay of a point cloud and an image, in accordance with some embodiments.
Figure 7B:
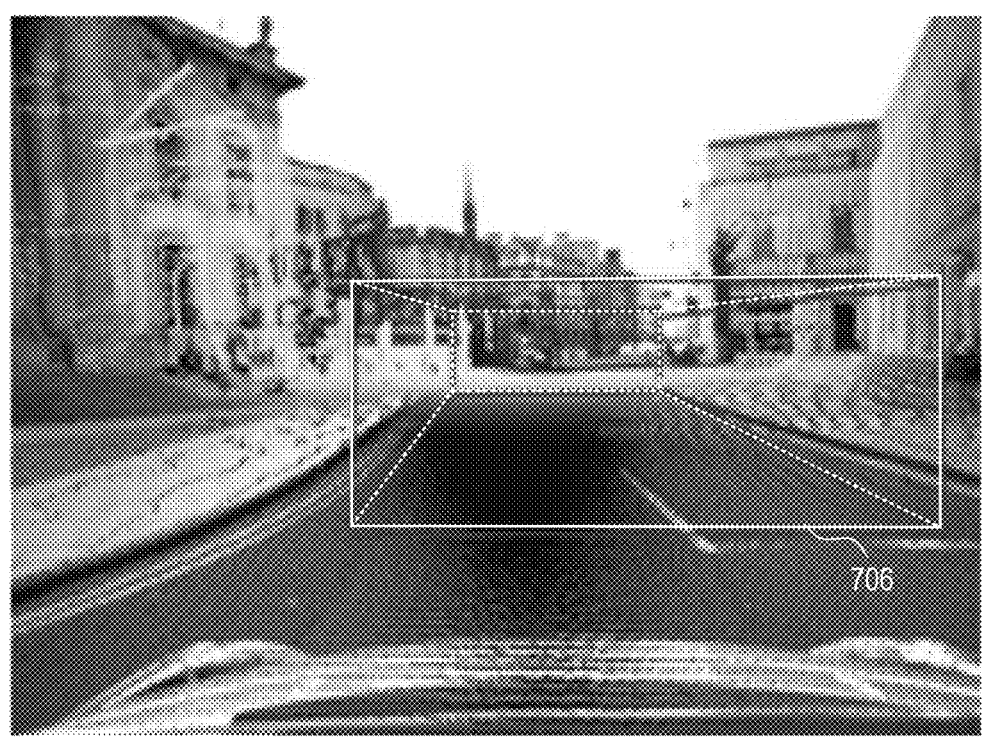
FIG. 7B is an illustration of a volumetric zone to be monitored in the overlay of FIG. 7A, in accordance with some embodiments.

FIGS. 7A and 7B depict (i) an example overlay 700 for an environment having a road 702 and buildings 704 on each side of the road and (ii) a volumetric space 706 corresponding to a zone selected by a user. In the depicted example, the volumetric space 706 is a rectangular cuboid. To draw the cuboid, the user interface can present a predefined rectangular cuboid having corners that the user can select and move to desired locations. For example, the user can place the predefined rectangular cuboid to a desired location and/or adjust the corner locations until the cuboid covers a desired region of the overlay. In alternative examples, the volumetric space 706 can be defined using a predefined sphere, pyramid, circle, triangle, ellipse, or other shape. A selectable list of predefined shapes may be presented to the user.

Referring again to FIG. 4B, at step 482, the server 401 may monitor lidar data to detect any changes or movements that occur in the volumetric space. This may include, for example: detecting one or more objects (e.g., based on live lidar data and/or available annotations) that enter or leave the volumetric space or move within the volumetric space; identifying (e.g., classifying) the one or more objects (e.g., determining that an object is or includes a person (e.g., any person or a particular person) or a vehicle (e.g., any vehicle or a particular vehicle)); and tracking positions, movements, and/or trajectories of the one or more objects in or around the volumetric space. In general, such events or actions can be or include any type of event or action that is detectable by a lidar device. The server 401 may record the events (e.g., as point cloud data) and/or may store descriptions of the events in a log. For example, the log may identify a number of people, vehicles, or other objects that were present in the volumetric space at any given time (e.g., as events unfolded). In some examples, when an object (e.g., a person) enters the volumetric space, the server 401 can flag one or more point cloud datapoints as being associated with the object and can monitor the object's movements or positions by tracking the flagged point cloud datapoints.

In various implementations, objects in or around the volumetric space can be detected, identified, and tracked using lidar-based object detection techniques. To identify such objects, for example, point cloud measurements may be supplied to "object detection" and/or "environmental perception" systems, which may be configured to analyze the point cloud measurements to identify one or more objects, such as people, vehicles, equipment, packages, products, etc. A lidar device may provide aggregated return signal data to an object detection and/or environmental perception system (e.g., in the lidar device or the server 401), which may analyze the aggregated return signal data and identify objects within aggregated point cloud measurements. In some instances, for example, lidar point cloud data can be provided to a machine learning model (or other predictive model) trained to identify objects in the point cloud data. Additionally or alternatively, in some instances, objects identified within point cloud data can be separated into background objects (e.g., walls, shelves, floors, etc.) and foreground objects (e.g., people, vehicles, etc.). The foreground objects can be identified, for example, by taking multiple scans of an environment and identifying objects (or points) that moved from scan-to-scan. Objects (or points) that did not move from scan-to-scan may be identified as background objects (e.g., stationary objects) or points. In certain examples, one or more lidar devices can generate a baseline map or scan of an environment (e.g., the warehouse 410) against which future scans can be compared to identify objects that have moved, appeared, or disappeared. In certain examples, the perception system can flag detected objects as being inside or outside a monitored volumetric space at any time.

Additionally or alternatively, in some examples, object detection can involve constructing a rectangular grid (e.g., defining adjacent voxels or cells) within a 3D space for a point cloud. Data points in the point cloud can be mapped to respective cells in the grid (e.g., each point can be assigned to a respective cell). Changes in point cloud data for each cell can be determined over time and, based on the determinations, each cell can be classified as dynamic or static. For example, a dynamic cell can be a cell for which point cloud data is changing (e.g., a point cloud point has entered or left the cell). Likewise, a static cell can be a cell for which point cloud data is not changing. The system (e.g., the object detection and/or environmental perception system) can then look for groups of adjacent dynamic cells. For example, if a threshold number (e.g., 4, 12, or 27) of adjacent cells are dynamic, the system can identify the adjacent dynamic cells as a group. Additionally or alternatively, the group of cells can be bounded with a box and/or recognized as an object (e.g., an arbitrary, indistinct object). Object identification techniques (e.g., using a machine learning model or other predictive model) can be performed to classify or characterize the object (e.g., as a person or a vehicle).

In certain implementations, object detection can involve use of a classifier (e.g., a deep learning classifier) and a velocity tracker. Incoming point cloud data can be decomposed into 3D voxels or cells. In some examples, the point cloud can be decomposed and recomposed between 2D and 3D with a set of convolutional layers. A predictive model (e.g., a neural network or deep learning model) can be used to estimate where any "interesting" regions are located in the point cloud. Such interesting regions can be or include, for example: a region where changes are occurring in the point cloud, a region where foreground objects appear to be located, a region having a set of points featuring a similar position and reflectivity, a region of space having a certain density (e.g., above a threshold density) of points, a region having a set of points forming a line, a curve, an angle, or other basic shape or feature, or a region having a set of points forming a more complex shape or feature (e.g., corresponding to a human or a car). For each of these regions, the system can estimate a likelihood or probability that there is an object in the region and, if so, can classify the object, based on model predictions.

In some embodiments, the server 401 may further send notifications to individuals who are interested in being kept apprised of any changes occurring within the volumetric space. For instance, the server 401 may push a notification to the user device 403 at step 484 when an event is detected. In some embodiments, notifications may be pushed only when certain criteria are satisfied (e.g., when a person, vehicle, or other object enters or exits the volumetric space or is detected within the volumetric space). The criteria used to determine when notifications are pushed can be selected by a user or operator of the system. In some instances, for example, notifications may be pushed for events that are uncommon (e.g., unexpected) and not pushed for events that are common (e.g., expected).

In some embodiments, one or more of the lidar devices 405 can include or utilize a sensor (e.g., an inertial sensor) that can detect movements of the lidar devices 405. When the sensor detects an unexpected movement of a lidar device 405, for example, the unexpected movement can be reported to the server 401, and a notification can be sent to a user. Further monitoring of the volumetric space can be halted, if needed, until the lidar device 405 has been returned to a desired position (e.g., an original position) and/or the point cloud data has been realigned or localized with the image or volumetric space.

Figure 7C:
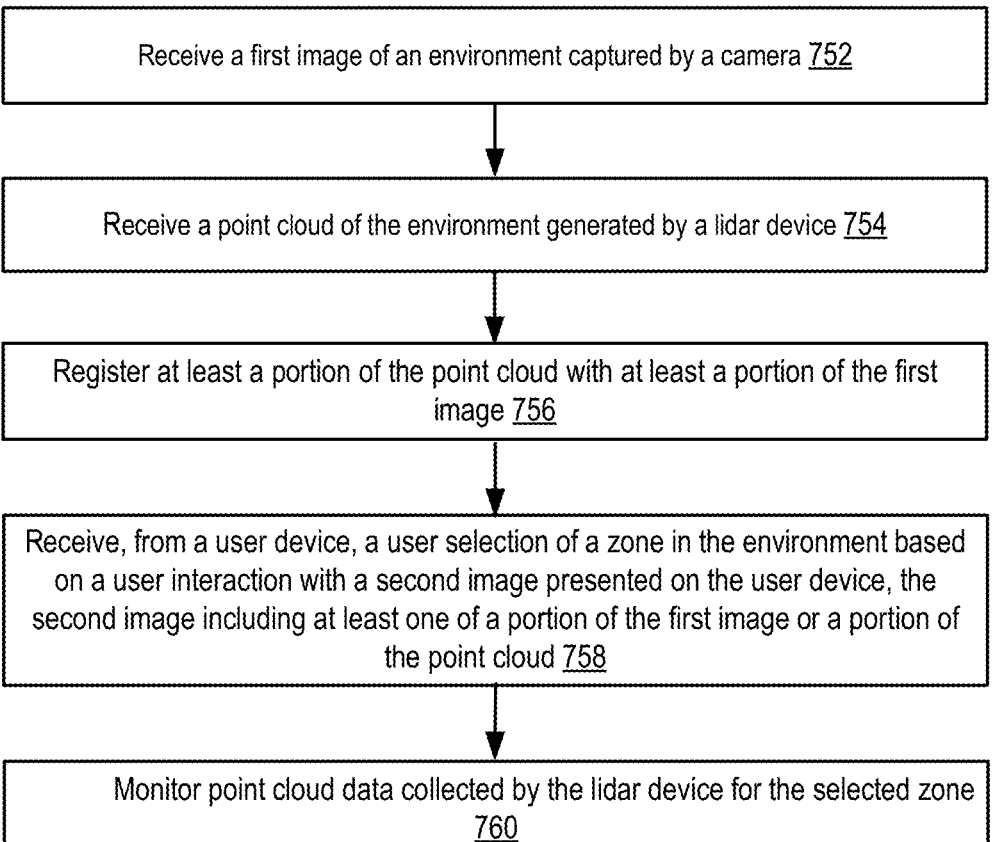
FIG. 7C is a flowchart of an example method for intelligent space management, in accordance with some embodiments.

FIG. 7C illustrates a flowchart of an example method 750 for intelligent space management, in accordance with some embodiments. The method 750 may be implemented by the intelligent space management system 400 described herein.

At step 752, a first image of an environment captured by a camera is received (e.g., at a backend server). The environment may be an indoor environment or an outdoor environment. The camera used for capturing the image may be included in a user device, such as a smartphone, or may be a standalone camera or other imaging device.

At step 754, a point cloud of the environment is received (e.g., at the backend server). The point cloud may be generated by a lidar device configured to monitor the environment. In some embodiments, multiple lidar devices may be configured to monitor the environment. The point cloud may be generated based on data obtained from the multiple lidar devices.

At step 756, at least a portion of the point cloud is registered with at least a portion of the first image. This can include, for example, aligning or fusing a portion of the point cloud with a portion of the first image (e.g., to obtain an overlay and an image thereof).

At step 758, a user selection of a zone in the environment is received (e.g., at the backend server) based on a user interaction with a second image, which can be or include a portion of the first image and/or a portion of the point cloud. For example, the second image may be the overlay (or image thereof) generated at step 756.

At step 760, point cloud data for the selected zone is monitored over time (e.g., by the backend server). When an event is detected in the zone (e.g., a person enters or exits the zone), a notification may be generated and sent to one or more user devices or other system components, to inform system users or operators about the event.

The intelligent space management systems and methods described herein (e.g., the system 400 or the method 750)

have a wide variety of applications. For example, in addition to the warehouse application described above (e.g., for the warehouse 410), the systems and methods can be used to monitor a docking zone in front of a loading dock, where trucks or other vehicles load or unload items. A volumetric space can be defined for the loading dock using the techniques described herein. For example, a user can capture an image of the loading dock on a smartphone, the image can be registered with point cloud data for the loading dock, and the user can interact with the image (or portion thereof) to define the volumetric space. Once defined, one or more lidar devices (and/or associated processors) can monitor the volumetric space to make sure the docking zone is clear before any vehicles enter. For example, when a truck is attempting to back into the docking zone and the lidar devices detect a person or other object in the docking zone, an alarm or warning can be activated to notify the person, a driver of the truck, and/or a docking zone operator about a potentially hazardous condition.

In another example, the systems and methods can be used for automatic metered parking. A parking lot, a parking garage, other parking facility (or any portion thereof) can be defined as having one or more volumetric spaces for monitoring. For example, a volumetric space can be defined for the parking facility and/or for one or more parking spaces in the parking facility (e.g., with each parking space having its own respective volumetric space). One or more lidar devices (and/or associated processors) can be used to monitor the volumetric space(s), track each vehicle that enters the facility, identify a parking spot where the vehicle parks, and log a dwell time for the vehicle (e.g., an amount of time the vehicle remains in the parking spot or parking facility). When the vehicle exits the parking facility, a parking fee can be calculated based on the dwell time and the driver can be charged the calculated amount.

In another example, the systems and methods can be used to detect loitering. A volumetric space can be defined for an area that presents a security risk (e.g., an area in or around a bank vault, or an area with sensitive documents or equipment). One or more lidar devices (and/or associated processors) can be used to monitor the dwell times of any people or vehicles that enter the volumetric space. When a dwell time exceeds a threshold (e.g., one minute), an alarm or warning can be activated and/or a system operator can be notified.

Some Examples of Continuous Wave (CW) Lidar Systems

As discussed above, some lidar systems may use a continuous wave (CW) laser to detect the range and/or velocity of targets, rather than pulsed TOF techniques. Such systems include continuous wave (CW) coherent lidar systems and frequency modulated continuous wave (FMCW) coherent lidar systems. For example, any of the lidar systems 100, 202, 250, and 270 described above can be configured to operate as a CW coherent lidar system or an FMCW coherent lidar system.

Lidar systems configured to operate as CW or FMCW systems can avoid the eye safety hazards commonly associated with pulsed lidar systems (e.g., hazards that arise from transmitting optical signals with high peak power). In addition, coherent detection may be more sensitive than direct detection and can offer better performance, including single-pulse velocity measurement and immunity to interference from solar glare and other light sources, including other lidar systems and devices.

Figure 8:
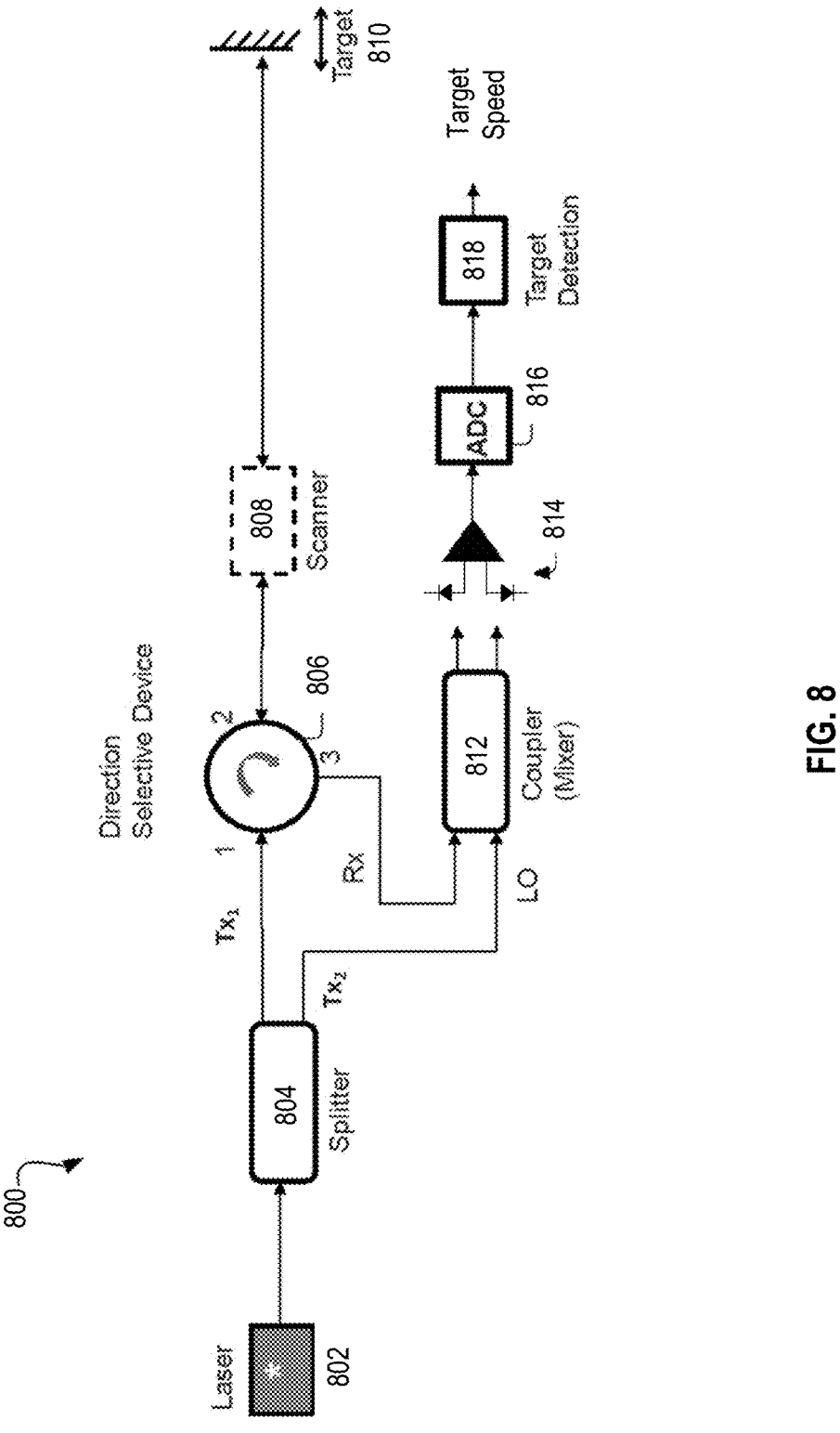
FIG. 8 is an illustration of an example continuous wave (CW) coherent lidar system, in accordance with some embodiments.

FIG. 8 illustrates an exemplary CW coherent lidar system 800 configured to determine the radial velocity (or speed) of a target. Lidar system 800 includes a laser 802 configured to produce a laser signal which is provided to a splitter 804. The laser 802 may provide a laser signal having a substantially constant laser frequency.

In one example, the splitter 804 provides a first split laser signal Tx1 to a direction selective device 806, which provides (e.g., forwards) the signal Tx1 to a scanner 808. In some examples, the direction selective device 806 is a circulator. The scanner 808 uses the first laser signal Tx1 to transmit light emitted by the laser 802 and receives light reflected by the target 810 (e.g., "reflected light" or "reflections"). The reflected light signal Rx is provided (e.g., passed back) to the direction selective device 806. The second laser signal Tx2 (provided by the splitter 804) and the reflected light signal Rx are provided to a coupler (also referred to as a mixer) 812. The mixer may use the second laser signal Tx2 as a local oscillator (LO) signal and mix it with the reflected light signal Rx. The mixer 812 may be configured to mix the reflected light signal Rx with the local oscillator signal LO. The mixer 812 may provide the mixed optical signal to differential photodetector 814, which may generate an electrical signal representing the beat frequency $f_{beat}$ of the mixed optical signals, where $f_{beat}=|f_{Tx2}-f_{Rx}|$ (the absolute value of the difference between the frequencies of the mixed optical signals). In some embodiments, the current produced by the differential photodetector 814 based on the mixed light may have the same frequency as the beat frequency $f_{beat}$. The current may be converted to a voltage by an amplifier (e.g., a transimpedance amplifier (TIA)), which may be provided (e.g., fed) to an analog-to-digital converter (ADC) 816 configured to convert the analog voltage signal to digital samples for a target detection module 818. The target detection module 818 may be configured to determine (e.g., calculate) the radial velocity of the target 810 based on the digital sampled signal with the beat frequency $f_{beat}$.

In one example, the target detection module 818 may identify Doppler frequency shifts using the beat frequency $f_{beat}$ and determine the radial velocity of the target 810 based on those shifts. For example, the radial velocity of the target 810 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 810. In some examples, the direction of the target 810 is indicated by the sign of the Doppler frequency shift $f_d$. For example, a positive signed Doppler frequency shift may indicate that the target 810 is traveling towards the system 800 and a negative signed Doppler frequency shift may indicate that the target 810 is traveling away from the system 800.

In one example, a Fourier Transform calculation is performed using the digital samples from the ADC 816 to recover the desired frequency content (e.g., the Doppler frequency shift) from the digital sampled signal. For example, a controller (e.g., target detection module 818) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the lidar system 800 is described above as being configured to determine the radial velocity of a target, it should be appreciated that the system can be configured to determine the range and/or radial velocity of a target. For example, the lidar system 800 can be modified to use laser chirps to detect the velocity and/or range of a target.

Some examples have been described in which a DFT is used to generate points of a point cloud based on a group of samples. However, frequency analysis techniques (e.g., spectrum analysis techniques) other than the DFT may be used to generate points of a point cloud based on a group of samples. Any suitable frequency analysis technique may be used, including, without limitation, Discrete Cosine transform (DCT), Wavelet transform, Auto-Regressive moving average (ARMA), etc.

Figure 9:
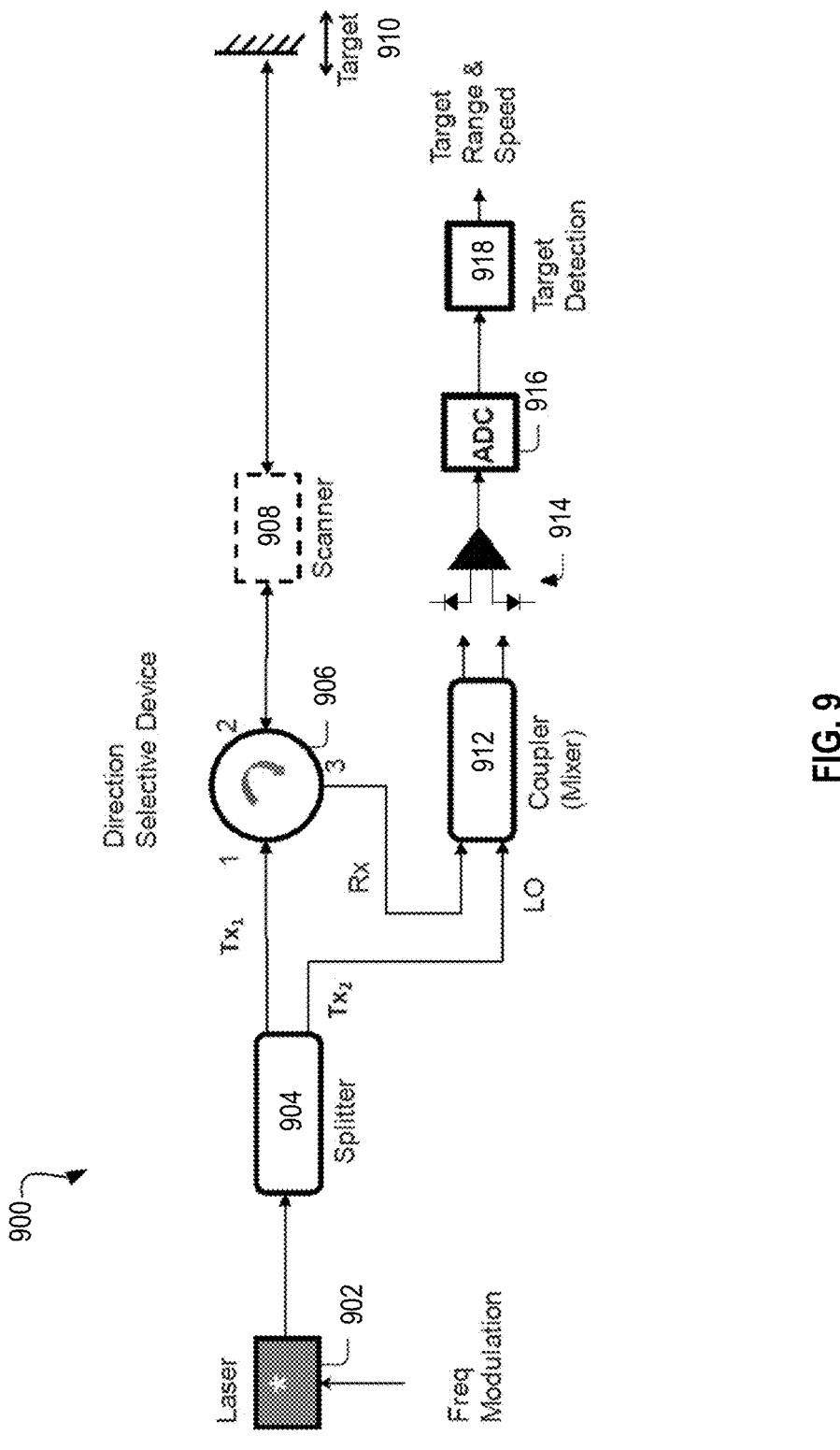
FIG. 9 is an illustration of an example frequency modulated continuous wave (FMCW) coherent lidar system, in accordance with some embodiments.

FIG. 9 illustrates an exemplary FMCW coherent lidar system 900 configured to determine the range and/or radial velocity of a target. Lidar system 900 includes a laser 902 configured to produce a laser signal which is fed into a splitter 904. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 902; however, in other examples, an external modulator can be placed between the laser source 902 and the splitter 904.

In other examples, the laser frequency can be "chirped" by modulating the phase of the laser signal (or light) produced by the laser 902. In one example, the phase of the laser signal is modulated using an external modulator placed between the laser source 902 and the splitter 904; however, in some examples, the laser source 902 may be modulated directly by changing operating parameters (e.g., current/voltage) or may include an internal modulator. Similar to frequency chirping, the phase of the laser signal can be increased ("ramped up") or decreased ("ramped down") over time.

Some examples of systems with FMCW-based lidar sensors have been described. However, some embodiments of the techniques described herein may be implemented using any suitable type of lidar sensors including, without limitation, any suitable type of coherent lidar sensors (e.g., phase-modulated coherent lidar sensors). With phase-modulated coherent lidar sensors, rather than chirping the frequency of the light produced by the laser (as described above with reference to FMCW techniques), the lidar system may use a phase modulator placed between the laser 902 and the splitter 904 to generate a discrete phase modulated signal, which may be used to measure range and radial velocity.

As shown, the splitter 904 provides a first split laser signal Tx1 to a direction selective device 906, which provides (e.g., forwards) the signal Tx1 to a scanner 908. The scanner 908 uses the first laser signal Tx1 to transmit light emitted by the laser 902 and receives light reflected by the target 910. The reflected light signal Rx is provided (e.g., passed back) to the direction selective device 906. The second laser signal Tx2 and reflected light signal Rx are provided to a coupler (also referred to as a mixer) 912. The mixer may use the second laser signal Tx2 as a local oscillator (LO) signal and mix it with the reflected light signal Rx. The mixer 912 may be configured to mix the reflected light signal Rx with the local oscillator signal LO to generate a beat frequency $f_{beat}$. The mixed signal with beat frequency $f_{beat}$ may be provided to a differential photodetector 914 configured to produce a current based on the received light. The current may be converted to voltage by an amplifier (e.g., a transimpedance amplifier (TIA)), which may be provided (e.g., fed) to an analog-to-digital converter (ADC) 916 configured to convert the analog voltage to digital samples for a target detection module 918. The target detection module 918 may be configured to determine (e.g., calculate) the range and/or radial velocity of the target 910 based on the digital sample signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW} \text{ (given a perfect linear chirp),}$$

$$\text{and Range: } R = \frac{f_{beat} c\, T_{ChirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent lidar systems may rely on two measurements having different slopes (e.g., negative and positive slopes) to remove this ambiguity. The two measurements having different slopes may also be used to determine range and velocity measurements simultaneously.

Figures 10A, 10B:
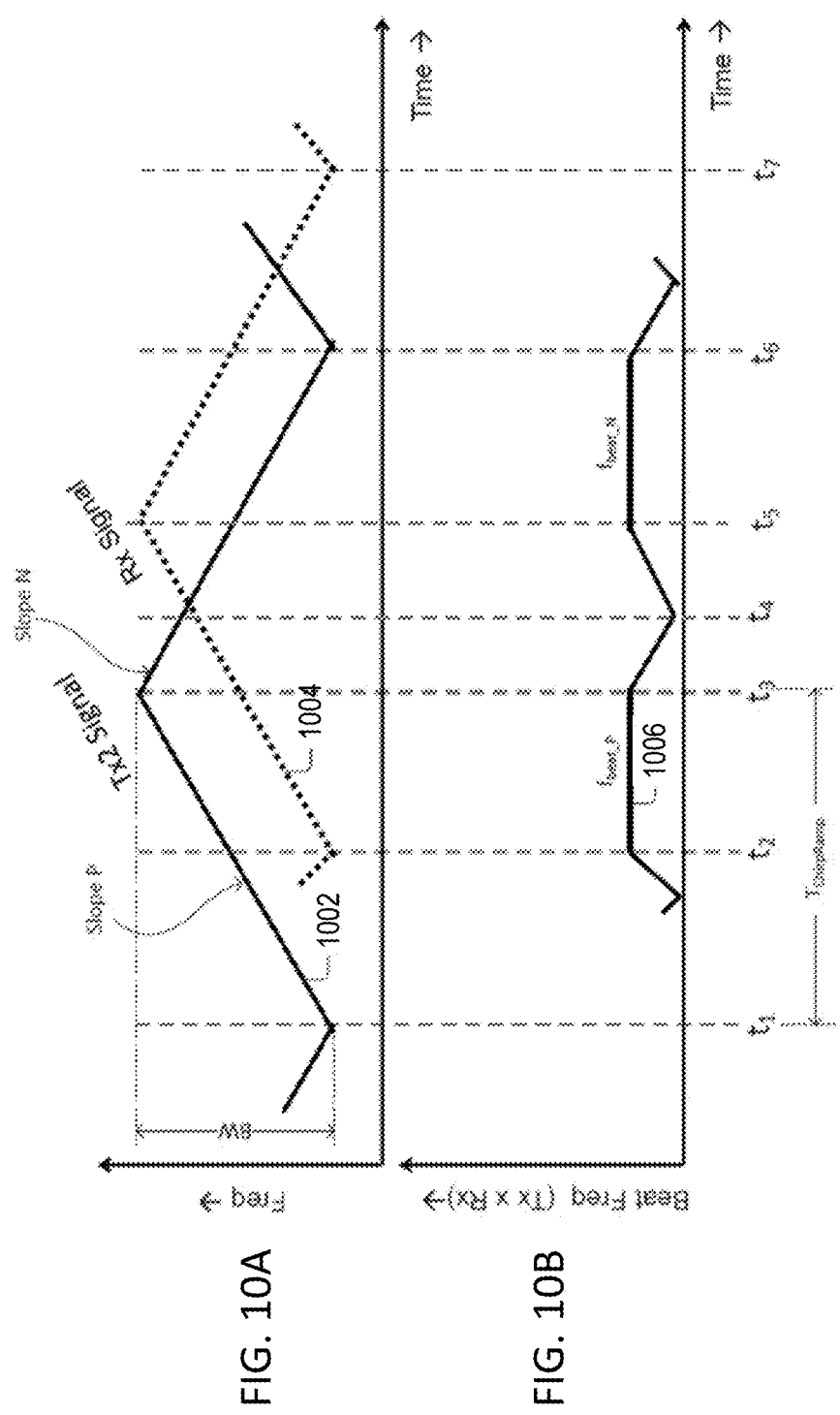
FIG. 10A is a plot of a frequency chirp as a function of time in a transmitted laser signal and reflected signal, in accordance with some embodiments.
FIG. 10B is a plot illustrating a beat frequency of a mixed signal, in accordance with some embodiments.

FIG. 10A is a plot of ideal (or desired) frequency chirp as a function of time in the transmitted laser signal Tx (e.g., signal Tx2), depicted in solid line 1002, and reflected light signal Rx, depicted in dotted line 1004. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 10B is a plot illustrating the corresponding ideal beat frequency $f_{beat}$ 1006 of the mixed signal Tx2×Rx. Note that the beat frequency $f_{beat}$ 1006 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 10A-10B, when the positive and negative ramp pair is used to measure range and velocity simultaneously, the following relationships are utilized:

$$\text{Range: } R = \frac{cT_{ChirpRamp}\frac{(f_{beat\_P} + f_{beat\_N})}{2}}{2BW},$$

$$\text{and Velocity: } V = \frac{\lambda\frac{(f_{beat\_P} - f_{beat\_N})}{2}}{2}$$

where $f_{beat\_P}$ and $f_{beat\_N}$ are beat frequencies generated during positive (P) and negative (N) slopes of the chirp 1002 respectively and $\lambda$ is the wavelength of the laser signal.

In one example, the scanner 908 of the lidar system 900 is used to scan the environment and generate a target point cloud from the acquired scan data. In some examples, the lidar system 900 can use processing methods that include performing one or more Fourier Transform calculations, such as a Fast Fourier Transform (FFT) or a Discrete Fourier Transform (DFT), to generate the target point cloud from the acquired scan data. Being that the system 900 is capable of measuring range, each point in the point cloud may have a three-dimensional location (e.g., x, y, and z) in addition to radial velocity. In some examples, the x-y location of each target point corresponds to a radial position of the target point relative to the scanner 908. Likewise, the z location of each target point corresponds to the distance between the target point and the scanner 908 (e.g., the range). In one example, each target point corresponds to one frequency chirp 1002 in the laser signal. For example, the samples collected by the system 900 during the chirp 1002 (e.g., t1 to t6) can be processed to generate one point in the point cloud.

Additional Embodiments, Computing Devices, and Information Handling Systems

Figure 11:
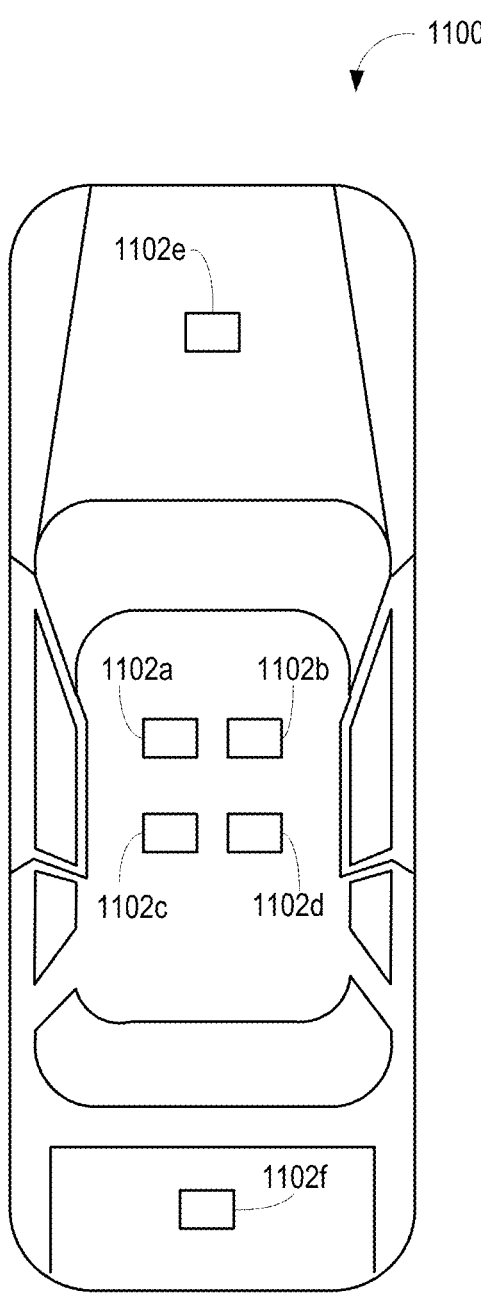
FIG. 11 is a diagram of a vehicle including a plurality of sensors, in accordance with some embodiments.

In some embodiments, lidar systems and techniques described herein may be used to provide mapping and/or autonomous navigation for a vehicle. FIG. 11 illustrates a vehicle 1100 having a plurality of sensors 1102. As shown, a first sensor 1102a, a second sensor 1102b, a third sensor 1102c, and a fourth sensor 1102d may be positioned in a first location on (or inside) the vehicle 1100 (e.g., the roof). Likewise, a fifth sensor 1102e may be positioned in a second location on (or inside) the vehicle 1100 (e.g., the front of the vehicle 1100) and a sixth sensor 1102f may be positioned in a third location on (or inside) the vehicle 1100 (e.g., the back of the vehicle 1100). In other examples, a different number or configuration of sensors may be used.

In some examples, at least one sensor of the plurality of sensors 1102 is configured to provide (or enable) 3D mapping of the vehicle's surroundings. In certain examples, at least one sensor of the plurality of sensors 1102 is used to provide autonomous navigation for the vehicle 1100 within an environment. In one example, each sensor 1102 includes at least one lidar system, device, or chip. The lidar system(s) included in each sensor 1102 may include any of the lidar systems disclosed herein. In some examples, at least one sensor of the plurality of sensors 1102 may be a different type of sensor (e.g., camera, radar, etc.). In one example, the vehicle 1100 is a car; however, in other examples, the vehicle 1100 may be a truck, boat, plane, drone, vacuum cleaner (e.g., robot vacuum cleaner), robot, train, tractor, ATV, or any other type of vehicle or moveable object.

In some embodiments, lidar systems and techniques described herein may be implemented using Silicon photonics (SiP) technologies. SiP is a material platform from which photonic integrated circuits (PICs) can be produced. SiP is compatible with CMOS (electronic) fabrication techniques, which allows PICs to be manufactured using established foundry infrastructure. In PICs, light propagates through a patterned silicon optical medium that lies on top of an insulating material layer (e.g., silicon on Insulator (SOI)). In some cases, direct bandgap materials (e.g., indium phosphide (InP)) are used to create light (e.g., laser) sources that are integrated in an SiP chip (or wafer) to drive optical or photonic components within a photonic circuit. SiP technologies are increasingly used in optical datacom, sensing, biomedical, automotive, astronomy, aerospace, AR/VR, AI applications, navigation, identification imaging, drones, robotics, etc.

Figure 12:
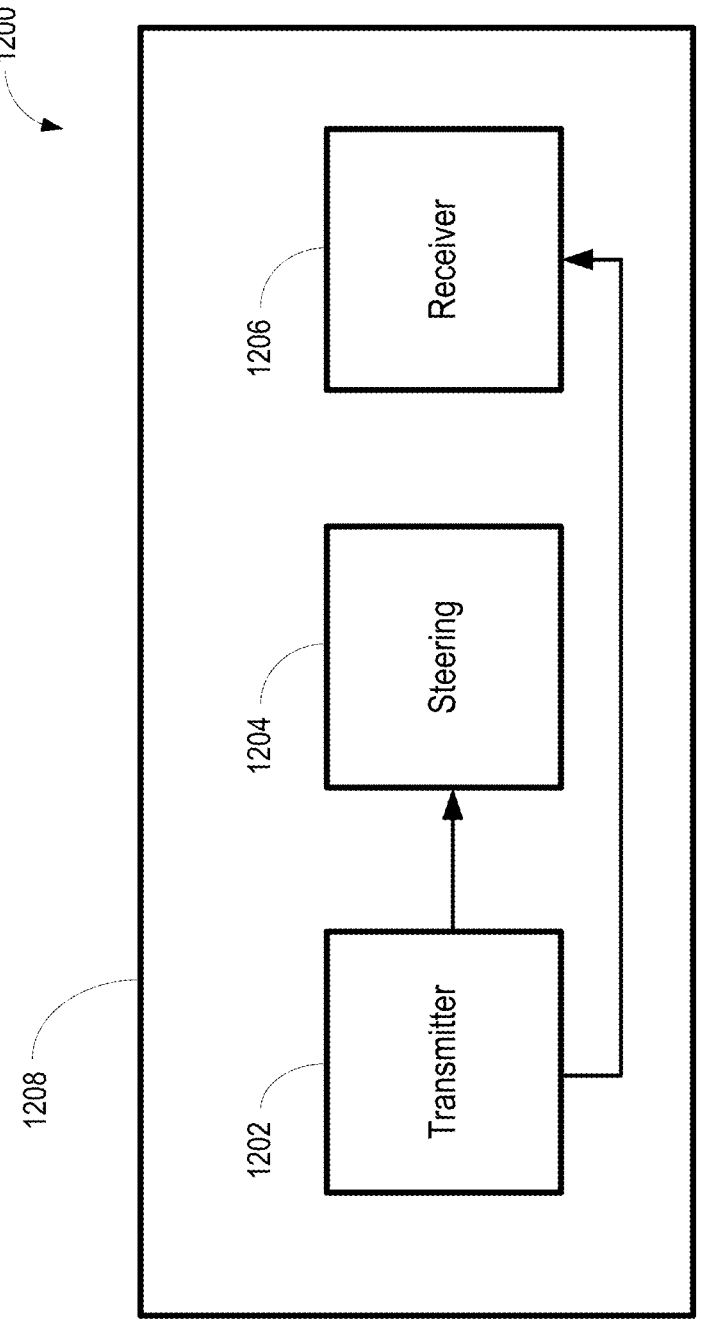
FIG. 12 is a block diagram of a silicon photonic integrated circuit (PIC) in accordance with aspects described herein.

FIG. 12 is a block diagram of a silicon photonic integrated circuit (PIC) 1200 in accordance with aspects described herein. In one example, the lidar systems described herein can be implemented as the PIC 1200. The PIC 1200 includes a transmitter module 1202, a steering module 1204, and a receiver module 1206. As shown, the transmitter module 1202, the steering module 1204, and the receiver module 1206 are integrated on a silicon substrate 1208. In other examples, the transmitter module 1202, the steering module 1204, or the receiver module 1206 may be included on a separate substrate. In some embodiments, the steering module 1204 is used by the PIC 1200 in connection with transmission (e.g., emission) and reception (e.g., collection) of optical signals. In some examples, the silicon substrate 1208 includes a silicon layer (e.g., 200 nm-10 micron thickness) disposed over an oxide layer (e.g., approximately 2 micron thickness). In certain examples, the silicon substrate 1208 can include multiple silicon and/or oxide layers.

In one example, the transmitter module 1202 includes at least one laser source. In some examples, the laser source(s) are implemented using a direct bandgap material (e.g., InP) and integrated on the silicon substrate 1208 via hybrid integration. The transmitter module 1202 may also include at least one splitter, a combiner, and/or a direction selective device that are implemented on the silicon substrate 1208 via monolithic or hybrid integration. In some examples, the laser source(s) are external to the PIC 1200 and the laser signal(s) can be provided to the transmission module 1202.

In some embodiments, lidar systems and techniques described herein may be implemented using micro-electro-mechanical systems (MEMS). A MEMS is a miniature device that has both mechanical and electronic components. The physical dimension of a MEMS can range from several millimeters to less than one micrometer. Lidar systems may include one or more scanning mirrors implemented as a MEMS mirror (or an array of MEMS mirrors). Each MEMS mirror may be a single-axis MEMS mirror or dual-axis MEMS mirror. The MEMS mirror(s) may be electromagnetic mirrors. A control signal is provided to adjust the position of the mirror to direct light in at least one scan direction (e.g., horizontal and/or vertical). The MEMS mirror(s) can be positioned to steer light transmitted by the lidar system and/or to steer light received by the lidar system. MEMS mirrors are compact and may allow for smaller form-factor lidar systems, faster control speeds, and more precise light steering compared to other mechanical-scanning lidar methods. MEMS mirrors may be used in solid-state (e.g., stationary) lidar systems and rotating lidar systems.

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), network storage device, or any other suitable device and may vary in size, shape, performance, functionality, and price.

Figure 13:
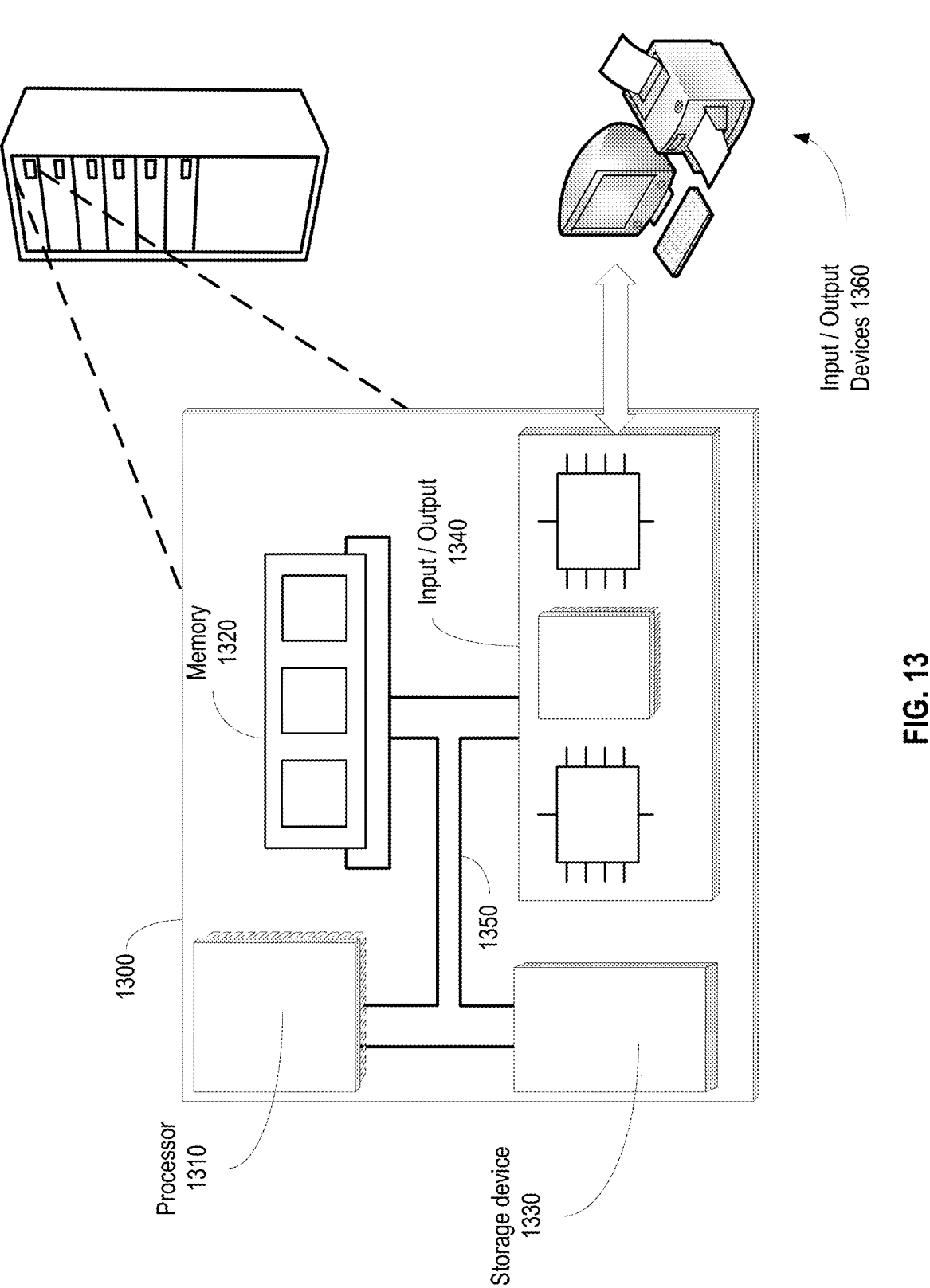
FIG. 13 is a block diagram of an example computer system, in accordance with some embodiments.

FIG. 13 is a block diagram of an example computer system 1400 that may be used in implementing the technology described in this document. General-purpose computers, network appliances, mobile devices, or other electronic systems may also include at least portions of the system 1400. The system 1400 includes a processor 1410, a memory 1320, a storage device 1330, and an input/output device 1340. Each of the components 1410, 1320, 1330, and 1340 may be interconnected, for example, using a system bus 1350. The processor 1410 is capable of processing instructions for execution within the system 1400. In some implementations, the processor 1410 is a single-threaded processor. In some implementations, the processor 1410 is a multi-threaded processor. In some implementations, the processor 1410 is a programmable (or reprogrammable) general purpose microprocessor or microcontroller. The processor 1410 is capable of processing instructions stored in the memory 1320 or on the storage device 1330.

The memory 1320 stores information within the system 1400. In some implementations, the memory 1320 is a non-transitory computer-readable medium. In some implementations, the memory 1320 is a volatile memory unit. In some implementations, the memory 1320 is a non-volatile memory unit.

The storage device 1330 is capable of providing mass storage for the system 1400. In some implementations, the storage device 1330 is a non-transitory computer-readable medium. In various different implementations, the storage device 1330 may include, for example, a hard disk device, an optical disk device, a solid-date drive, a flash drive, or some other large capacity storage device. For example, the storage device may store long-term data (e.g., database data, file system data, etc.). The input/output device 1340 provides input/output operations for the system 1400. In some implementations, the input/output device 1340 may include one or more of network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1330 may be implemented in a distributed way over a network, for example as a server farm or a set of widely distributed servers, or may be implemented in a single computing device.

Although an example processing system has been described in FIG. 13, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

FIG. 12 depicts a simplified block diagram of a computing device/information handling system (or computing system) according to embodiments of the present disclosure. It will be understood that the functionalities shown for system 1200 may operate to support various embodiments of an information handling system—although it shall be understood that an information handling system may be differently configured and include different components.

Figure 14:
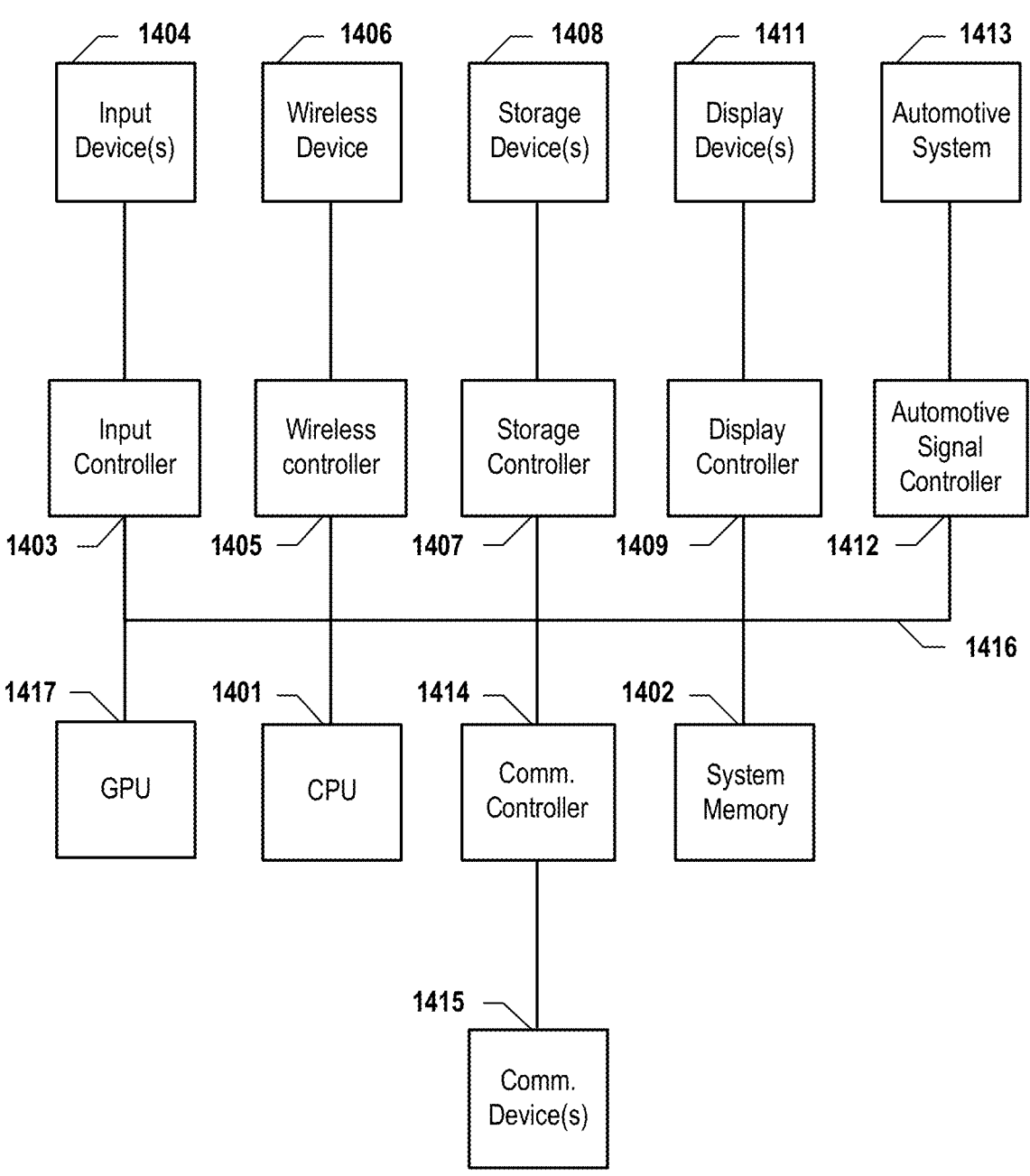
FIG. 14 is a block diagram of a computing device/information handling system, in accordance with some embodiments.

As illustrated in FIG. 14, system 1400 includes one or more central processing units (CPU) 1401 that provide(s) computing resources and control(s) the computer. CPU 1401 may be implemented with a microprocessor or the like, and may also include one or more graphics processing units (GPU) 1417 and/or a floating point coprocessor for mathematical computations. System 1400 may also include a system memory 1402, which may be in the form of random-access memory (RAM), read-only memory (ROM), or both.

A number of controllers and peripheral devices may also be provided. For example, an input controller 1403 represents an interface to various input device(s) 1404, such as a keyboard, mouse, or stylus. There may also be a wireless controller 1405, which communicates with a wireless device 1406. System 1400 may also include a storage controller 1407 for interfacing with one or more storage devices 1408, each of which includes a storage medium such as a magnetic tape or disk, or an optical medium that might be used to record programs of instructions for operating systems, utilities, and applications, which may include embodiments of programs that implement various aspects of the techniques described herein. Storage device(s) 1408 may also be used to store processed data or data to be processed in accordance with some embodiments. System 1400 may also include a display controller 1409 for providing an interface to a display device 1411, which may be a cathode ray tube (CRT), a thin film transistor (TFT) display, or other type of display. The computing system 1400 may also include an automotive signal controller 1412 for communicating with an automotive system 1413. A communications controller 1414 may interface with one or more communication devices 1415, which enables system 1400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter.

Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

In embodiments, aspects of the techniques described herein may be implemented using machine learning and/or artificial intelligence technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. A value of a feature may be a measurement of the corresponding property of an entity or an instance of information regarding an entity. Features can also have data types. For instance, a feature can have an image data type, a numerical data type, a text data type (e.g., a structured text data type or an unstructured ("free") text data type), a categorical data type, or any other suitable data type. In general, a feature's data type is categorical if the set of values that can be assigned to the feature is finite.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security; transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

As used herein, "data analytics" may refer to the process of analyzing data (e.g., using machine learning models, artificial intelligence, models, or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Data analytics tools are used to guide decision-making and/or to control systems in a wide variety of fields and industries, e.g., security; transportation; risk assessment and management; supply chain logistics; and energy management. The processes used to develop data analytics tools suitable for carrying out specific data analytics tasks generally include steps of data collection, data preparation, feature engineering, model generation, and/or model deployment.

As used herein, "spatial data" may refer to data relating to the location, shape, and/or geometry of one or more spatial objects. Data collected by lidar systems, devices, and chips described herein may be considered spatial data. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment). In some cases, a spatial object may be represented as a cluster of points in a 3D point-cloud.

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

"Computer vision" generally refers to the use of computer systems to analyze and interpret image data. In some embodiments, computer vision may be used to analyze and interpret data collected by lidar systems (e.g., point-clouds). Computer vision tools generally use models that incorporate principles of geometry and/or physics. Such models may be trained to solve specific problems within the computer vision domain using machine learning techniques. For example, computer vision models may be trained to perform object recognition (recognizing instances of objects or object classes in images), identification (identifying an individual instance of an object in an image), detection (detecting specific types of objects or events in images), etc.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), or high-level (e.g., objects, scenes, events, etc.). The detection/segmentation function may involve selection of a subset of the input image data (e.g., one or more images within a set of images, one or more regions within an image, etc.) for further processing.

EXAMPLE CLAUSES

A. A computer-implemented method of monitoring an environment, the method comprising: receiving, at a server computer, a first image of the environment captured by a camera; receiving, at the server computer, a point cloud of the environment generated by at least one lidar device; registering, at the server computer, at least a portion of the point cloud with at least a portion of the first image; receiving, at the server computer and from a user device, a user selection of a zone in the environment based on a user interaction with a second image presented on the user device, the second image comprising at least one of a portion of the first image or a portion of the point cloud; and monitoring, at the server computer, point cloud data collected by the at least one lidar device for the selected zone.

B. The method of clause A, wherein registering the at least a portion of the point cloud with the at least a portion of the first image comprises aligning the at least a portion of the point cloud with the at least a portion of the first image from a perspective of the camera when the first image was captured.

C. The method of clause A or B, wherein registering the at least a portion of the point cloud with the at least a portion of the first image comprises correlating one or more objects in the point cloud with one or more respective objects in the first image.

D. The method of any of clauses A to C, wherein the user selection comprises a user-defined area within the second image.

E. The method of any of clauses A to D, further comprising: defining, at the server computer, a three-dimensional volumetric space corresponding to the user-defined area.

F. The method of any of clauses A to E, wherein monitoring the point cloud data for the selected zone comprises monitoring point cloud data corresponding to the three-dimensional volumetric space.

G. The method of any of clauses A to F, wherein monitoring the point cloud data for the selected zone comprises: determining, based on the point cloud data, that an object has entered the selected zone; identifying, based on the point cloud data, that the object comprises a person; and tracking, based on the point cloud data, a position of the object within the selected zone.

H. The method of any of clauses A to G, wherein the environment comprises an interior region of a building.

I. The method of any of clauses A to H, wherein the user device comprises the camera.

J. The method of any of clauses A to I, wherein a lidar device from the at least one lidar device is mounted in a fixed position within the environment.

K. The method of any of clauses A to J, further comprising: detecting, at the server computer, a change in the selected zone based on the point cloud data; and pushing, at the server computer, a notification to the user device to notify a user about the change.

L. A system for monitoring an environment, comprising: a processor; and a non-transitory memory communicatively coupled to the processor, the non-transitory memory comprising instructions that, when executed by the processor, cause the processor to: receive a first image of an environment captured by a camera; receive a point cloud of the environment generated by at least one lidar device; register at least a portion of the point cloud with at least a portion of the first image; receive, from a user device, a user selection of a zone in the environment based on a user interaction with a second image presented on the user device, the second image comprising at least one of a portion of the first image or a portion of the point cloud; and monitor point cloud data collected by the at least one lidar device for the selected zone.

M. The system of clause L, wherein, to register the at least a portion of the point cloud with the at least a portion of the first image, the instructions further cause the processor to align the at least a portion of the point cloud with the at least a portion of the first image from a perspective of the camera when the first image was captured.

N. The system of clause L or M, wherein, to register the at least a portion of the point cloud with the at least a portion of the first image, the instructions further cause the processor to correlate one or more objects in the point cloud with one or more respective objects in the first image.

O. The system of any of clauses L to N, wherein the user selection comprises a user-defined area within the second image.

P. The system of any of clauses L to O, wherein the instructions further cause the processor to: define a three-dimensional volumetric space corresponding to the user-defined area.

Q. The system of any of clauses L to P, wherein, to monitor the point cloud data for the selected zone, the instructions further cause the processor to monitor point cloud data corresponding to the three-dimensional volumetric space.

R. The system of any of clauses L to Q, wherein, to monitor the point cloud data for the selected zone, the instructions further cause the processor to: determine, based on the point cloud data, that an object has entered the selected zone; identify, based on the point cloud data, that the object comprises a person; and track, based on the point cloud data, a position of the object within the selected zone.

S. The system of any of clauses L to R, wherein the environment comprises an interior region of a building.

T. The system of any of clauses L to S, wherein a lidar device from the at least one lidar device is mounted in a fixed position within the environment.

U. The system of any of clauses L to T, wherein the instructions further cause the processor to: detect a change in the selected zone based on the point cloud data; and push a notification to the user device to notify a user about the change.

V. An article comprising: a non-transitory computer-readable medium having instructions stored thereon that, when executed by one or more computer processors, cause the one or more computer processors to perform operations comprising: receiving a first image of an environment captured by a camera; receiving a point cloud of the environment generated by at least one lidar device; registering at least a portion of the point cloud with at least a portion of the first image; receiving, from a user device, a user selection of a zone in the environment based on a user interaction with a second image presented on the user device, the second image comprising at least one of a portion of the first image or a portion of the point cloud; and monitoring point cloud data collected by the at least one lidar device for the selected zone.

W. A system comprising: a lidar sensor configured to scan an environment and generate a point cloud; and a non-transitory memory communicatively coupled to a processor, the non-transitory memory comprising instructions that, when executed by the processor, cause the processor to: receive data identifying a volumetric space within the environment, wherein the volumetric space was defined by registering (i) at least a portion of the point cloud with (ii) at least a portion of a first image of the environment captured by a camera, and receiving a user selection of the volumetric space based on a user interaction with a second image presented on a user device, the second image comprising at least one of a portion of the first image or a portion of the point cloud; identify, in the point cloud, a set of points corresponding to an object in the environment; determine, based on the point cloud, that the object is inside the volumetric space; and generate, based on the determination, metadata indicating that the object is inside the volumetric space.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method of monitoring an environment, the method comprising:
   receiving, at a server computer, a first image of an environment captured by a camera;
   receiving, at the server computer, a point cloud of the environment generated by at least one lidar device;
   registering, at the server computer, at least a portion of the point cloud with at least a portion of the first image;
   receiving, at the server computer and from a user device, a user selection of a zone in the environment based on a user interaction with a second image presented on the user device, the second image comprising the first image, wherein the zone is a portion of the environment; and
   monitoring, at the server computer, point cloud data collected by the at least one lidar device for the selected zone, wherein a lidar device from the at least one lidar device is mounted in a fixed position within the environment.

2. The method of claim 1, wherein registering the at least a portion of the point cloud with the at least a portion of the first image comprises aligning the at least a portion of the point cloud with the at least a portion of the first image from a perspective of the camera when the first image was captured.

3. The method of claim 1, wherein registering the at least a portion of the point cloud with the at least a portion of the first image comprises correlating one or more objects in the point cloud with one or more respective objects in the first image.

4. The method of claim 1, wherein the user selection comprises a user-defined area within the second image.

5. The method of claim 4, further comprising:
   defining, at the server computer, a three-dimensional volumetric space corresponding to the user-defined area.

6. The method of claim 5, wherein monitoring the point cloud data for the selected zone comprises monitoring point cloud data corresponding to the three-dimensional volumetric space.

7. The method of claim 1, wherein monitoring the point cloud data for the selected zone comprises:
   determining, based on the point cloud data, that an object has entered the selected zone;
   identifying, based on the point cloud data, that the object comprises a person; and
   tracking, based on the point cloud data, a position of the object within the selected zone.

8. The method of claim 1, wherein the environment comprises an interior region of a building.

9. The method of claim 1, wherein the user device comprises the camera.

10. The method of claim 1, further comprising:
   detecting, at the server computer, a change in the selected zone based on the point cloud data; and
   pushing, at the server computer, a notification to the user device to notify a user about the change.

11. A system for monitoring an environment, comprising:
   a processor; and
   a non-transitory memory communicatively coupled to the processor, the non-transitory memory comprising instructions that, when executed by the processor, cause the processor to:
      receive a first image of an environment captured by a camera;

receive a point cloud of the environment generated by at least one lidar device;

register at least a portion of the point cloud with at least a portion of the first image;

receive, from a user device, a user selection of a zone in the environment based on a user interaction with a second image presented on the user device, the second image comprising the first image, wherein the zone is a portion of the environment; and monitor point cloud data collected by the at least one lidar device for the selected zone, wherein a lidar device from the at least one lidar device is mounted in a fixed position within the environment.

12. The system of claim 11, wherein, to register the at least a portion of the point cloud with the at least a portion of the first image, the instructions further cause the processor to align the at least a portion of the point cloud with the at least a portion of the first image from a perspective of the camera when the first image was captured.

13. The system of claim 12, wherein, to register the at least a portion of the point cloud with the at least a portion of the first image, the instructions further cause the processor to correlate one or more objects in the point cloud with one or more respective objects in the first image.

14. The system of claim 11, wherein the user selection comprises a user-defined area within the second image.

15. The system of claim 14, wherein the instructions further cause the processor to:

define a three-dimensional volumetric space corresponding to the user-defined area.

16. The system of claim 15, wherein, to monitor the point cloud data for the selected zone, the instructions further cause the processor to monitor point cloud data corresponding to the three-dimensional volumetric space.

17. The system of claim 11, wherein, to monitor the point cloud data for the selected zone, the instructions further cause the processor to:

determine, based on the point cloud data, that an object has entered the selected zone;

identify, based on the point cloud data, that the object comprises a person; and track, based on the point cloud data, a position of the object within the selected zone.

18. The system of claim 11, wherein the environment comprises an interior region of a building.

19. The system of claim 11, wherein a lidar device from the at least one lidar device is mounted in a fixed position within the environment.

20. The system of claim 11, wherein the instructions further cause the processor to:

detect a change in the selected zone based on the point cloud data; and push a notification to the user device to notify a user about the change.

21. An article comprising:

a non-transitory computer-readable medium having instructions stored thereon that, when executed by one or more computer processors, cause the one or more computer processors to perform operations comprising:

receiving a first image of an environment captured by a camera;

receiving a point cloud of the environment generated by at least one lidar device;

registering at least a portion of the point cloud with at least a portion of the first image;

receiving, from a user device, a user selection of a zone in the environment based on a user interaction with a second image presented on the user device, the second image comprising at least one of a portion of the first image or a portion of the point cloud; and monitoring point cloud data collected by the at least one lidar device for the selected zone.

22. A system comprising:

a lidar sensor configured to scan an environment and generate a point cloud; and a non-transitory memory communicatively coupled to a processor, the non-transitory memory comprising instructions that, when executed by the processor, cause the processor to:

receive data identifying a volumetric space within the environment, wherein the volumetric space was defined by registering (i) at least a portion of the point cloud with (ii) at least a portion of a first image of the environment captured by a camera;

receiving a user selection of the volumetric space based on a user interaction with a second image presented on a user device, the second image comprising at least one of a portion of the first image or a portion of the point cloud;

identify, in the point cloud, a set of points corresponding to an object in the environment;

determine, based on the point cloud, that the object is inside the volumetric space; and generate, based on the determination, metadata indicating that the object is inside the volumetric space.

\* \* \* \* \*